(12) United States Patent
Aharon et al.

(10) Patent No.: US 10,466,422 B1
(45) Date of Patent: Nov. 5, 2019

(54) FTIR/TIR OPTICAL SWITCH USING A MOVING WAVEGUIDE

(71) Applicants: Yissum Research Development Company of the Hebrew University LTD., Jerusalem (IL); Mellanox Technologies, Ltd., Yokneam (IL)

(72) Inventors: Eran Aharon, Mevaseret Zion (IL); Dan Mark Marom, Mevaseret Zion (IL); Elad Mentovich, Tel Aviv (IL)

(73) Assignees: Mellanox Technologies, Ltd., Yokneam (IL); Yissum Research Development Company of the Hebrew University LTD., Jerusalem (IL)

( * ) Notice: Subject to any disclaimer, the term of this patent is extended or adjusted under 35 U.S.C. 154(b) by 0 days.

(21) Appl. No.: 15/980,768

(22) Filed: May 16, 2018

(51) Int. Cl.
*G02B 6/35* (2006.01)
*G02B 6/122* (2006.01)

(52) U.S. Cl.
CPC ............. *G02B 6/354* (2013.01); *G02B 6/122* (2013.01); *G02B 6/3502* (2013.01); *G02B 6/357* (2013.01); *G02B 6/3512* (2013.01)

(58) Field of Classification Search
CPC ...................................................... G02B 6/354
See application file for complete search history.

(56) References Cited

U.S. PATENT DOCUMENTS

| 5,932,887 A * | 8/1999 | Guzik ..................... G01B 11/14 250/559.29 |
| 6,519,382 B1 * | 2/2003 | Jurbergs ............... G02B 6/3502 385/16 |
| 6,548,841 B2 * | 4/2003 | Frazier ................... G11C 23/00 257/254 |
| 6,628,858 B2 * | 9/2003 | Zhang ................ G02B 6/12007 385/16 |
| 6,801,679 B2 * | 10/2004 | Koh .................... G02B 6/12004 213/24 |
| 6,982,185 B2 * | 1/2006 | Kubena ............... G01P 15/0802 438/455 |

(Continued)

FOREIGN PATENT DOCUMENTS

EP 1186932 A2 3/2002

OTHER PUBLICATIONS

Seok et al., "Large-scale broadband digital silicon photonic switches with vertical adiabatic couplers", Optica, vol. 3, No. 1, pp. 64-70, Jan. 2016.

(Continued)

*Primary Examiner* — Peter Radkowski
(74) *Attorney, Agent, or Firm* — Kligler & Associates Patent Attorneys Ltd.

(57) ABSTRACT

An optical device includes a first waveguide having a longitudinal axis and a first end facet inclined at a non-normal angle to the longitudinal axis, and a second waveguide, which has a second end facet and is fixed with the second end facet in proximity to and parallel with the first end facet. An actuator is coupled to move the first end facet of the first waveguide in a direction transverse to the longitudinal axis between a first position in which a distance between the first and second end facets is less than 25 nm, and a second position in which the distance between the first and second end facets is greater than 300 nm.

10 Claims, 19 Drawing Sheets

(56) References Cited

U.S. PATENT DOCUMENTS

| | | | | |
|---|---|---|---|---|
| 2002/0153583 A1* | 10/2002 | Frazier | ............... | G11C 23/00 |
| | | | | 257/448 |
| 2002/0153584 A1* | 10/2002 | Frazier | ............... | G11C 23/00 |
| | | | | 257/448 |
| 2003/0067047 A1* | 4/2003 | Sandoe | ........... | H01H 59/0009 |
| | | | | 257/415 |
| 2003/0113067 A1* | 6/2003 | Koh | ............... | G02B 6/12004 |
| | | | | 385/48 |
| 2003/0128918 A1* | 7/2003 | Zhang | ............ | G02B 6/12007 |
| | | | | 385/24 |
| 2003/0141562 A1* | 7/2003 | Kubena | ............ | G01P 15/0802 |
| | | | | 257/415 |
| 2004/0037488 A1* | 2/2004 | Guidotti | ............ | G02B 6/3536 |
| | | | | 385/16 |
| 2004/0184720 A1* | 9/2004 | Kubby | ............... | G02B 6/358 |
| | | | | 385/22 |

OTHER PUBLICATIONS

Morphic, "Approach; Consortium", 5 pages, year 2018.
Quack, N., Note re MORPHIC presentation on Diamond Photocs and Silicon Photonic MEMS, 1 page, May 13, 2018 (downloaded from https://twitter.com/QLAB_EPFL/status/995692952344322049).

* cited by examiner

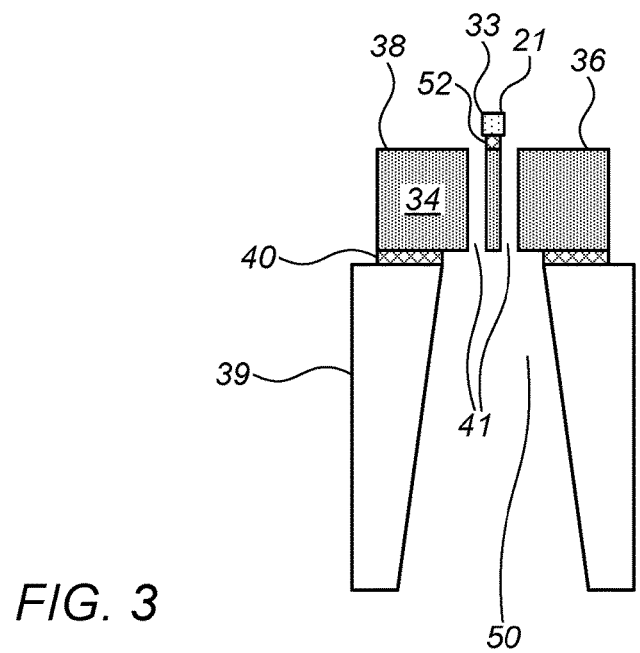
FIG. 3
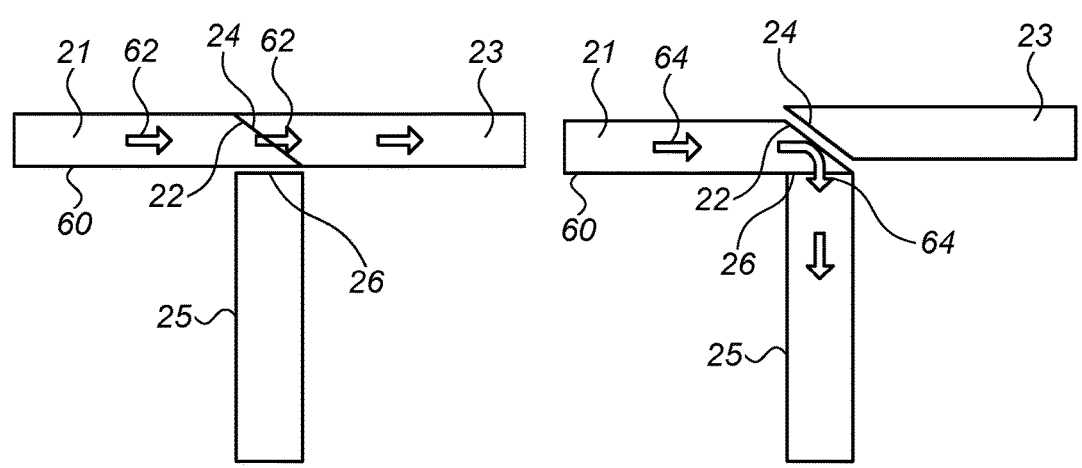
FIG. 4A                    FIG. 4B

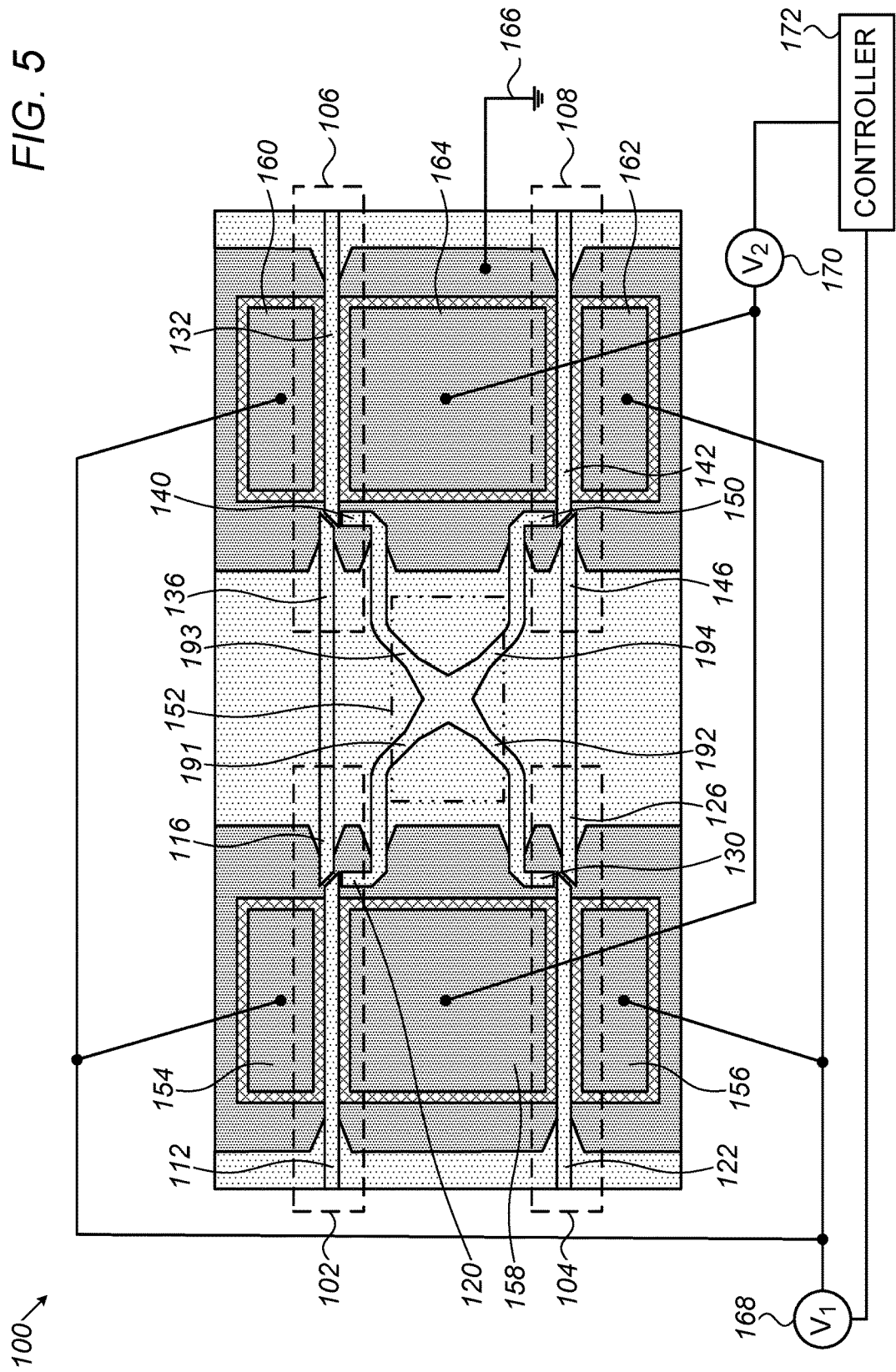

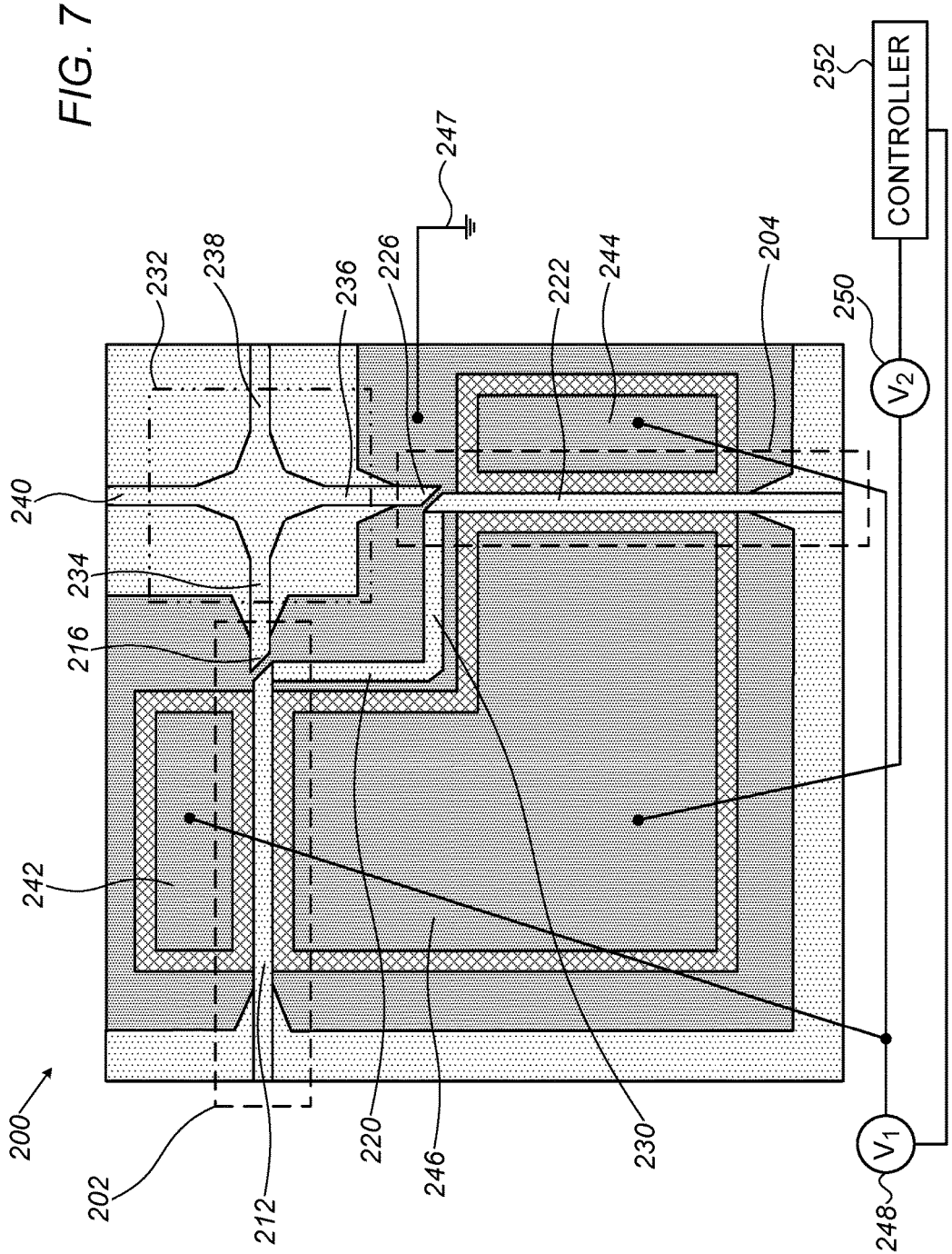

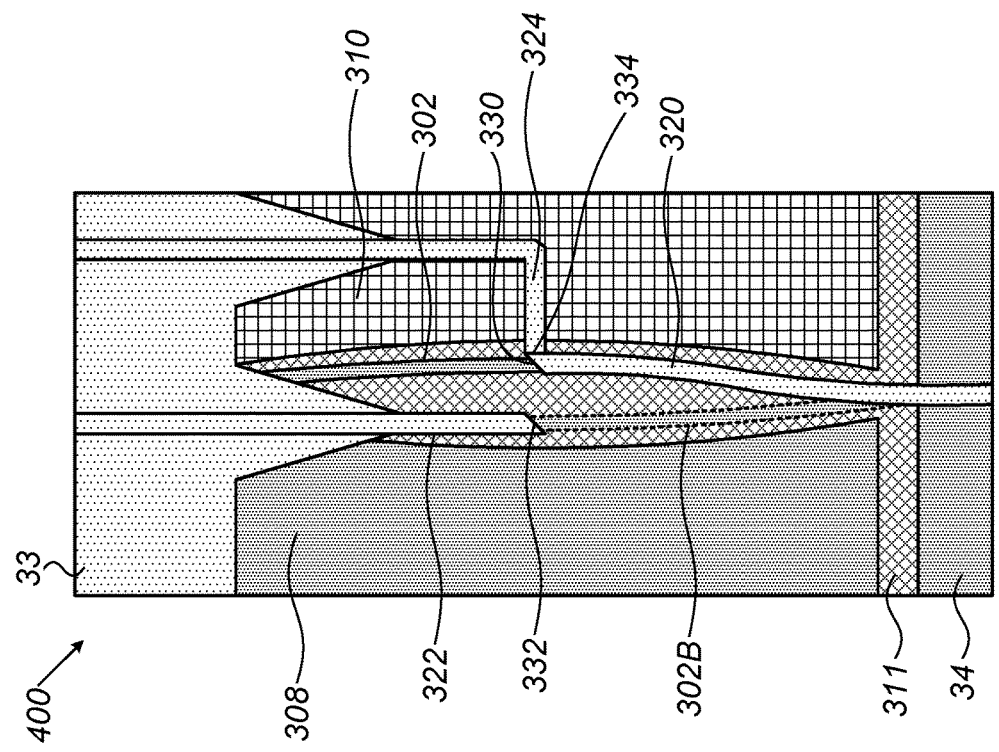
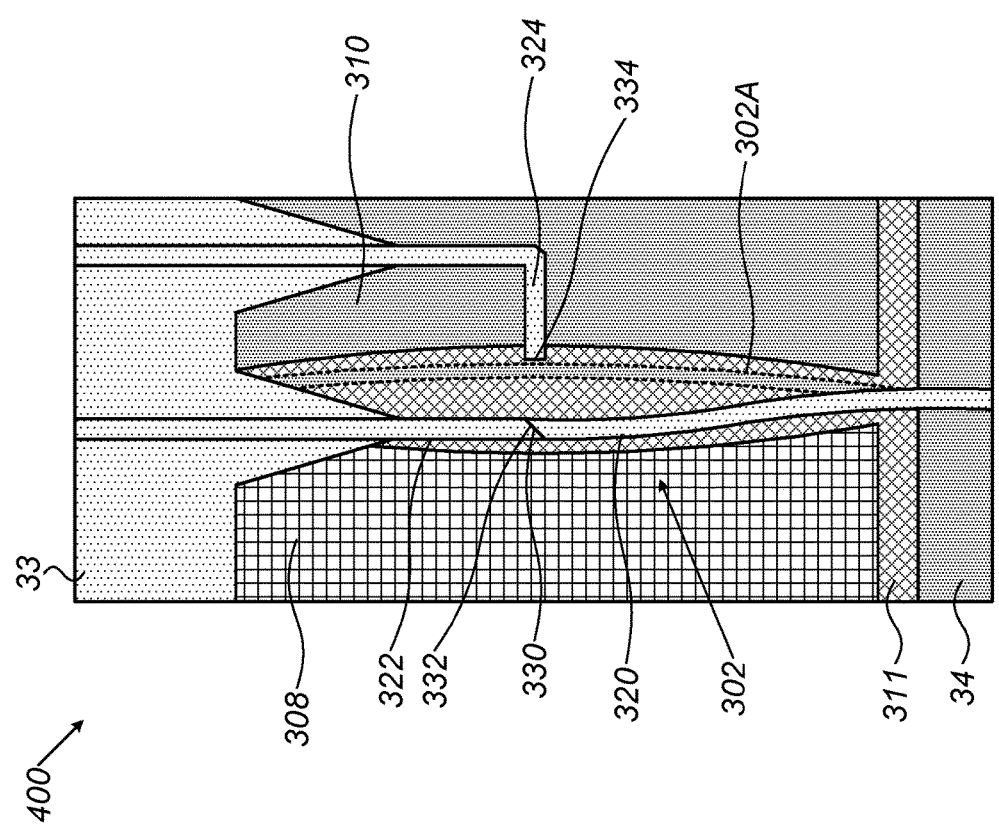

FTIR/TIR OPTICAL SWITCH USING A MOVING WAVEGUIDE

FIELD OF THE INVENTION

The present invention relates generally to photonic devices, and particularly to optical switches based on mechanical motion, including specifically micro-electromechanical systems.

BACKGROUND

In optical communication systems, optical switches are used to direct optical signals along desired transmission paths or to route these optical signals around a fault in the transmission path. The transmission path is typically an optical fiber, a form of waveguide. There are many physical mechanisms for performing optical switching from one or more input waveguides to one or more output waveguides. Some key performance parameters of optical switches include their transmission losses to desired output port, cross-talk to undesired ports, switching time, physical size, scalability and cost.

It has been suggested that frustrated total internal reflection can be used in optical switching. For example, U.S. Pat. No. 6,519,382 describes an optical switch for processing an optical signal, where the switch includes an input waveguide having a reflective surface, a first output waveguide coupled to the input waveguide, and a second output waveguide. The second output waveguide has a first position spaced apart from the reflective surface of the input waveguide such that the reflective surface totally internally reflects an optical signal toward the first output waveguide. The second output waveguide has a second position in proximal contact with the reflective surface to frustrate the total internal reflection of the optical signal such that the second output waveguide receives the optical signal.

SUMMARY

Embodiments of the present invention that are described hereinbelow provide an improved optical switch.

There is therefore provided, in accordance with an embodiment of the invention, an optical device, including a first waveguide having a longitudinal axis and a first end facet inclined at a non-normal angle to the longitudinal axis, and a second waveguide, which has a second end facet and is fixed with the second end facet in proximity to and parallel with the first end facet. An actuator is coupled to move the first end facet of the first waveguide in a direction transverse to the longitudinal axis between a first position in which a distance between the first and second end facets is less than 25 nm, and a second position in which the distance between the first and second end facets is greater than 300 nm.

In some embodiments, in the first position the first end facet contacts the second end facet.

In some embodiments, the device includes a third waveguide, which has a third end facet and is fixed in a disposition such that when the first end facet is in the second position, radiation propagating through the first waveguide is reflected from the first end facet through a side surface of the first waveguide and into the third waveguide through the third end facet. Typically, in the second position, the side surface of the first waveguide contacts the third end facet. In a disclosed embodiment, the second waveguide is aligned along the longitudinal axis, and wherein the first and second end facets are angled at 45° relative to the longitudinal axis.

In some embodiments, the actuator includes a micro-electromechanical system (MEMS) mechanism. In one such embodiment, the MEMS mechanism includes a substrate, with at least one electrode formed on the substrate. A conductive cantilever beam is formed on the substrate in proximity to the at least one electrode, wherein the first waveguide is mounted on the cantilever beam, and the cantilever beam has a first end that is attached to the substrate and a second end, in proximity to the first end facet of the first waveguide, that is released from the substrate. A controller is coupled to apply a varying electrical potential between the at least one electrode and the cantilever beam so as to deflect the cantilever beam between the first and second positions of the first waveguide.

In one embodiment, the at least one electrode includes a pair of electrodes, and the cantilever beam is disposed between the electrodes.

Additionally or alternatively, the substrate includes a silicon-on-insulator (SOI) substrate, including a silicon substrate, an isolation layer formed on the silicon substrate, wherein the isolation layer includes a dielectric material, and an actuation layer formed on the isolation layer. The actuation layer includes silicon, which is doped for conducting electricity, and the conductive cantilever beam is formed in the actuation layer. In a disclosed embodiment, the dielectric material includes silicon dioxide.

Further additionally or alternatively, the conductive cantilever beam is configured to latch in first and second stable beam configurations, such that in the first stable beam configuration the first end facet is in the first position and in the second stable beam configuration the first end facet is in the second position. The controller is coupled to apply a varying electrical potential between the two electrodes and the beam so as to bend the beam between the first and second stable beam positions.

There is also provided, in accordance with an embodiment of the invention, an optical switching apparatus including a plurality of optical switches. Each switch includes a first waveguide having a longitudinal axis and a first end facet inclined at a non-normal angle to the longitudinal axis; a second waveguide, which has a second end facet and is fixed with the second end facet in proximity to and parallel with the first end facet; and a third waveguide, which has a third end facet and is fixed in a disposition such that when the first end facet is in the second position, radiation propagating through the first waveguide is reflected from the first end facet through a side surface of the first waveguide and into the third waveguide through the third end facet. An actuator is coupled to move the first end facet of the first waveguide in a direction transverse to the longitudinal axis between a first position in which a distance between the first and second end facets is less than 25 nm, and a second position in which the distance between the first and second end facets is greater than 300 nm. A waveguide inter-connection having multiple legs is connected to respective waveguides of the optical switches, so that actuation of the optical switches interconnects different ones of the waveguides via the waveguide inter-connection.

In one embodiment, the plurality of optical switches include a first switch, a second switch, a third switch, and a fourth switch, wherein the second waveguide of the first switch is connected to the second waveguide of the second switch, and the second waveguide of the third switch is connected to the second waveguide of the fourth switch, and wherein the waveguide cross-connector connects the third waveguide of the first switch to the third waveguide of the third switch and connects the third waveguide of the second switch to the third waveguide of the fourth switch.

In another embodiment, the plurality of optical switches include at least a first switch and a second switch, wherein the waveguide cross-connector connects the second waveguide of the first switch to the second waveguide of the second switch, and wherein the third waveguide of the first switch is connected to the third waveguide of the second switch.

In some embodiments, the waveguide inter-connection includes interconnect waveguides, which are routed so as to cross each other at right angles. In one embodiment, all of the interconnect waveguides in the waveguide inter-connection cross one another only at right angles.

There is additionally provided, in accordance with an embodiment of the invention, a method for manufacturing an optical device. The method includes fixing a first waveguide, having a longitudinal axis and a first end facet inclined at a non-normal angle to the longitudinal axis, to an actuator, which is configured to move the first end facet of the first waveguide in a direction transverse to the longitudinal axis. A second waveguide, which has a second end facet, is fixed so that the second end facet is in proximity to and parallel with the first end facet. The actuator is driven to move between a first position in which a distance between the first and second end facets is less than 25 nm, and a second position in which the distance between the first and second end facets is greater than 300 nm.

There is further provided, in accordance with an embodiment of the invention, a method for switching an optical signal. The method includes introducing an optical signal into a first waveguide having a longitudinal axis and a first end facet inclined at a non-normal angle to the longitudinal axis. A second end facet of a second waveguide is placed in proximity to and parallel with the first end facet. The optical signal is switched between the first and second waveguides by moving at least one of the first and second end facets in a direction transverse to the longitudinal axis between a first position in which the optical signal is reflected from the first end facet due to total internal reflection (TIR) and a second position in which the optical signal propagates into the second waveguide by frustrated total internal reflection (FTIR).

The present invention will be more fully understood from the following detailed description of the embodiments thereof, taken together with the drawings in which:

BRIEF DESCRIPTION OF THE DRAWINGS

FIG. 3 is a schematic cross-section of the optical switch of FIG. 1, in accordance with an embodiment of the invention;

FIGS. 4A-B are schematic top views of the optical switch of FIG. 1 in two different switching states, in accordance with an embodiment of the invention;

FIG. 5 is a schematic top view of an optical bypass-exchange switch based on four 1×2 optical switches, in accordance with an embodiment of the invention;

FIG. 7 is a schematic top view of an optical crossbar switch based on two optical 1×2 switches, in accordance with an embodiment of the invention;

FIGS. 10A-B are schematic top views of an optical latching switch in different switching states, in accordance with an embodiment of the invention;

FIGS. 11A-M and FIG. 11O-V are schematic sectional views showing stages in a possible process flow of the fabrication of an optical switch, while

DETAILED DESCRIPTION OF EMBODIMENTS

Overview

Figure 1:
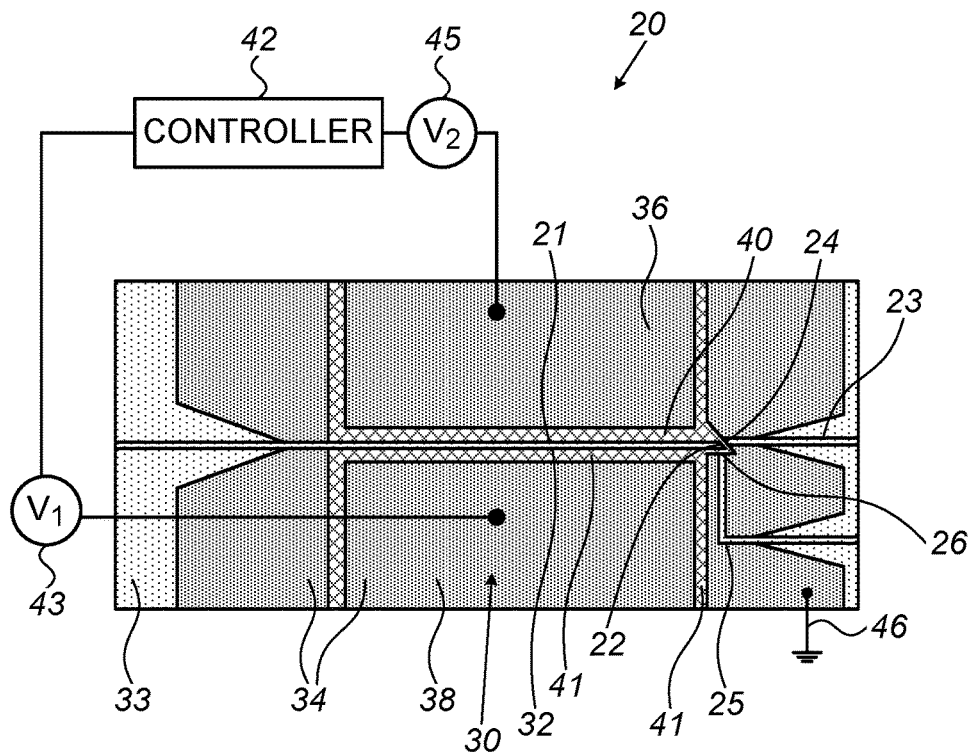
FIG. 1 is a schematic top view of an optical switch, in accordance with an embodiment of the invention.

Despite the widespread use of fiberoptic communications, there is an unmet need for optical switches that are fast, small, reliable and inexpensive. Embodiments of the present invention that are described herein address this need by providing an optical switch utilizing frustrated total internal reflection (FTIR). Optical switches and switch networks are examples of optical devices in accordance with various embodiments of the invention.

FTIR is based on total internal reflection (TIR), wherein a beam of light propagating in a material with a high refractive index $n_1$ (for example, glass) encounters an interface to a material with a low refractive index $n_2$ (for example, air) at an angle of incidence that is higher than the critical angle θ. (The critical angle θ is $\theta=\arcsin(n_2/n_1)$). At TIR, all of the optical energy is reflected from the interface between the two materials back to the high refractive index material. If a body having a sufficiently high refractive index is brought close to the high/low refractive index interface from the low-index side, however, some of the light will "leak" into this body. This phenomenon is known as frustrated total internal reflection (FTIR). For any appreciable amount of light to leak into the body, the distance to the interface needs to be within a fraction of the wavelength of the light, with the portion of the leakage increasing with diminishing distance.

In the disclosed embodiments, the optical switch includes a first waveguide and a second waveguide with non-normal end facets arranged so that the two end facets are parallel to each other and in close proximity. An actuator is coupled to move the end of the first waveguide in a direction transverse to the longitudinal axis of the waveguide between two positions:

1) A first position in which the end facet of the first waveguide is brought to within a distance of typically 25 nm or less from the angle-matched end facet of the second waveguide, and possibly into contact with this end facet. This proximity of the two end facets enables an optical signal propagating in the first waveguide to propagate with minimal reflection losses into the second waveguide due to FTIR.

2) A second position in which the end facet of the first waveguide is moved away from the end facet of the second waveguide, typically to a distance of 300 nm or more, or possibly more than 1000 nm. At this second position, light propagating in the first waveguide strikes the end facet of the first waveguide at an angle larger that the critical angle and experiences TIR, radiating (or emitting) out of the first waveguide via its sidewall at an angle that is efficiently collected by a suitably positioned third waveguide.

Between the first and second positions the first waveguide is in a neutral position. This is a position where the actuator is not activated and does not bend the first waveguide in any direction.

Thus, shifting the first waveguide by a small distance, typically a few hundreds of nanometers, between the first and second positions, the optical signal propagating in the first waveguide is either coupled to the second waveguide or to the third waveguide. This describes a 1×2 optical switch. The same mechanism can be operated in reverse to couple selectively optical signals from the second or third waveguides into the first waveguide, as well as assembled into a 2×1 optical switch. This scheme is particularly well-suited for actuation by a MEMS mechanism, although other sorts of actuators that are known in the art may alternatively be used.

Basic Switch Configurations

FIG. 1 is a schematic top view of an optical switch 20, in accordance with an embodiment of the invention. Optical switch 20 comprises a first waveguide 21 with a first end facet 22, a second waveguide 23, parallel to and slightly laterally shifted with respect to first waveguide 21, and with a second end facet 24, and a third waveguide 25, perpendicular to first waveguide 21, and with a third end facet 26. End facets 22, 24, and 26 are planar. In an alternative embodiment end facets 22, 24, and 26 may be slightly convex with a typical radius of curvature of 1 mm, so as to reduce the contact area when the end facets touch each other or another optical surface. A reduced contact area helps to reduce stiction forces between the touching surfaces.

Waveguides 21, 23, and 25 confine light to their core geometry and material, and may in general be either single-mode or multi-mode waveguides or combinations thereof. In the present embodiment, the waveguides are made of silicon in a strip waveguides design, with a height of 3 µm and a width of 2.8 µm and positioned on top of an silicon oxide layer with air cladding around the other surfaces, making them multi-mode waveguides. In alternative embodiments, other dimensions and core and cladding materials may be used. Waveguides 21, 23, and 25 are etched into a silicon waveguide layer 33, which is transparent over a typical wavelength band of 1200-1600 nm used in, for example, optical communications. First and second end facets 22 and 24, respectively, are parallel to each other and in this embodiment are inclined at an angle of 45° with respect to the common longitudinal axis of first and second waveguides 21 and 23, which runs in the horizontal direction in FIG. 1. Third end facet 26 is perpendicular to the longitudinal axis of third waveguide 25, and the third waveguide is perpendicular to first waveguide 21 due to the choice of the end facet angle of 45° for first and second end facets 22 and 24, respectively.

In an alternative embodiment (not shown in the figures), an angle that is different from 45° may be used for end facets 22 and 24, respectively, as long as the condition for TIR is satisfied. Choosing an angle different from 45° will change the direction of the totally internally reflected radiation exiting from first waveguide 21. Consequently, the angle of third end facet 26 with respect to third waveguide 25, as well as the angle of the third waveguide with respect to the first waveguide should be respectively modified.

First waveguide 21 is attached to an actuator 30, which bends the first waveguide in the plane of switch 20 so that first end facet 22 shifts in direction transverse to the longitudinal axis, from a neutral position (where the first waveguide is not bent) either to a first position on one side or to a second position on the opposite side. Both positions reduce the distance between the tip of the first waveguide and the targeted output waveguide to a sub-wavelength distance, and desirably coming into direct contact with the target waveguide. The distance to the undesired output waveguide should be sufficiently large so that very little light couples to the unintended waveguide (a criterion of −25 dB or lower or higher can be employed, as defined by the target application). In the embodiment shown in FIG. 1 comprising a silicon waveguide, the distance to the undesired waveguide is 600 nm, and can be larger to ensure good isolation (i.e. low crosstalk).

Optical switch 20 is be implemented by a stack of three silicon layers:

1) A substrate 39 (also called a handle) is a thick layer (typically 400-1000 µm thick), whose primary purpose is to carry the top layers above it and provide mechanical rigidity.

2) An actuation layer 34 is of intermediate thickness (typically 3-100 µm) and provides mechanical actuation and electrical addressability.

3) A waveguide layer 33 is relatively thin (typically 0.1-10 µm) and provides optical waveguiding.

Figure 2:
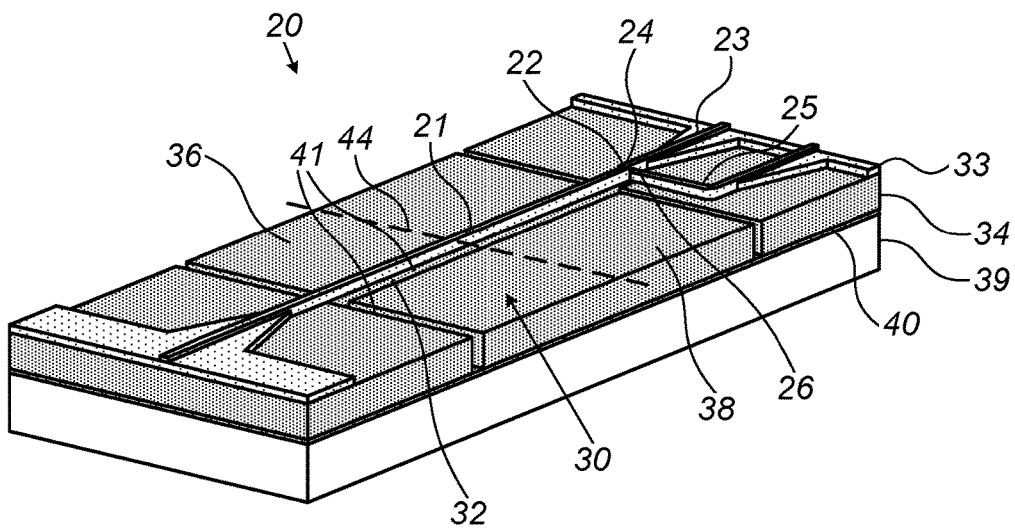
FIG. 2 is a schematic perspective view of the optical switch of FIG. 1, in accordance with an embodiment of the invention.

Actuator 30 comprises a conductive silicon cantilever beam 32, which is etched into actuation layer 34 using methods known in MEMS technology. Further details of layers 33, 34, and 39 are shown in FIGS. 2-3. Silicon cantilever beam 32 is hidden by first waveguide 21 in the top view of FIG. 1, but is shown in FIGS. 2-3. Electrodes 36 and 38 are formed in actuation layer 34 on two sides of cantilever beam 32, and are isolated from the substrate 39 by an isolation layer 40 and from other parts of actuation layer 34 by etched trenches 41. Isolation layer 40 is typically $SiO_2$ with a thickness of 1.5 µm, but other isolation materials and thicknesses commonly used in semiconductor and MEMS technology may be used.

A controller 42 is coupled to a first voltage source 43 and a second voltage source 45, which in turn are coupled to electrodes 36 and 38. Cantilever beam 32 is coupled to a ground potential 46 via the part of actuating layer 34 that is not connected to electrodes 36 and 38. By applying suitable potentials between cantilever beam 32 and electrodes 36 and 38, controller 42 causes cantilever beam 32 to bend, and with it first waveguide 21, and first end facet 22 is laterally translated to either the first or the second position. For example, applying a voltage (positive or negative) to electrode 36 while simultaneously grounding (bringing to zero potential) both cantilever beam 32 and opposite electrode 38, will cause the cantilever beam to bend towards electrode 36 due to the attractive force between potential differences of the two. A typical voltage range for bending cantilever beam 32 to either the first or the second position is 10-45 V (depending strongly on the physical and geometrical parameters of actuator 30).

In an alternative embodiment (not shown in the figures), cantilever beam 32 may be coupled, instead of to ground potential 46, through a separate voltage source to controller 42, so that the potential of the cantilever beam, as well as the potentials of electrodes 36 and 38, may be independently controlled by the controller.

FIG. 2 is a schematic perspective view of optical switch 20, in accordance with an embodiment of the invention. Conducting silicon cantilever beam 32 is now visible under first waveguide 21. The left end of cantilever beam 32 (in the view shown in FIGS. 1 and 2) is attached to actuation layer 34, while the remainder of the cantilever, including the right end, in proximity to end facet 22 of first waveguide 21, is free-standing (i.e., released from isolation layer 40 and the rest of actuation layer 34) and thus free to bend towards either electrode 36 or 38. For the sake of clarity, controller 42, as well as voltage sources 43 and 45, have has been omitted from this figure. A line 44 denotes the location for a schematic cross-section of optical switch 20 shown in FIG. 3.

FIG. 3 is a schematic cross-section of optical switch 20, in accordance with an embodiment of the invention. The cross-section is taken across first waveguide 21 and cantilever beam 32, as shown by line 44 in FIG. 2.

All three silicon layers (waveguide layer 33, actuation layer 34, and substrate 39) are visible in FIG. 3. Actuation layer 34 is typically doped for increased electrical conductivity. For electrical isolation between the layers, isolation layer 40 is disposed between substrate 39 and actuation layer 34, while an optical isolation layer 52 is disposed between waveguide layer 33 and actuation layer 34. Electrical isolation layers are typically formed in $SiO_2$. Cantilever beam 32 and a trough 50 between electrodes 36 and 38 have been etched through actuation layer 34 using methods known in semiconductor and MEMS technologies, such as photolithographic methods and etching. First waveguide 21 is attached to and isolated from cantilever beam 32 by optical isolation layer 52 in order to prevent optical losses, or preventing the confined optical mode from leaking into the cantilever beam. Optical isolation layer 52 is fabricated of $SiO_2$ or other suitable dielectric.

FIGS. 4A-B are schematic top views of optical switch in two different switching states, illustrating the operation of the switch, in accordance with an embodiment of the invention.

In FIG. 4A, first waveguide 21 is in the first position, and first and second end facets 22 and 24, respectively, are very close to each other (typically less than 25 nm) and desirably in contact. As depicted in FIGS. 4A-B, the end facet angles of first and second end facets 22 and 24, respectively, are 45°. A side wall 60 of first waveguide 21 is typically within a few hundred to a few thousand nanometers from third end facet 26. An optical signal propagating in first waveguide 21 continues with minimal losses into second waveguide 23 through first and second end facets 22 and 24, respectively, due to FTIR. The propagating signal is shown by arrows 62.

In FIG. 4B, first waveguide 21 is in the second position. First and second end facets 22 and 24 are separated from each other by at least a few hundred nanometers. Side wall 60 and third end facet 26 are very close to each other (typically less than 100 nm), and desirably in contact with each other. The optical signal propagating in first waveguide 21 is totally reflected by first end facet 22 due to TIR and is emitted through side wall 60, entering third waveguide 25 through third end facet 26, as shown by arrows 64. Due to TIR, no optical signal is transmitted to second waveguide 23.

Based on the inventors' calculations, a cross-talk ratio lower than −40 dB is achieved for a translation of 300 nm from the neutral position towards the first position, when the gap between first and second end facets 22 and 24 is very small, typically 5 nm or less. A similar cross-talk ratio is achieved for a translation of 300 nm towards the second position.

FIGS. 4A-B describe a 1×2 optical switch. The same mechanism can be operated in reverse to couple selectively optical signals from the second and third waveguides into the first waveguide, as well as assembled into a 2×1 optical switch.

Although the embodiments described above relate to a particular MEMS device configuration and geometry, the principles of the present invention may similarly be applied, mutatis mutandis, in other configurations and geometries using other technologies. For example, an optical switch in accordance with these principles may controllably couple optical signals between first and second waveguides 21 and 23 without necessarily including third waveguide 25 in the location that is shown in the figures. As another example, other sorts of actuators, including actuators using only a single electrode, or other means of moving the end facets, may be used.

Multi-Switch Configurations

FIG. 5 is a schematic top view of an optical bypass-exchange switch 100 based on four 1×2 optical switches, in accordance with an embodiment of the invention.

Bypass-exchange switch 100 (or 2×2 switch) comprises four optical 1×2 switches on a common substrate, with the switches marked by dotted lines and labelled as 102, 104, 106, and 108. Each switch is substantially identical to optical switch 20 of FIGS. 1-3, and the switches are configured pair-wise in a back-to-back configuration. For clarity, the silicon layers, common to all four switches, are not labelled. Similarly to optical switch 20, switches 102, 104, 106, and 108 comprise first, second, and third waveguides according to Table 1, below.

TABLE 1

| Labelling of waveguides in bypass-exchange switch 100 | | | |
|---|---|---|---|
| 1 × 2 switch | first waveguide | second waveguide | third waveguide |
| 102 | 112 | 116 | 120 |
| 104 | 122 | 126 | 130 |
| 106 | 132 | 136 | 140 |
| 108 | 142 | 146 | 150 |

Second waveguides 116 and 136 of switches 102 and 106, respectively, are coupled to each other. Similarly, second waveguides 126 and 146 of switches 104 and 108, respectively, are coupled to each other. The third waveguides are coupled through a waveguide cross-connector 152, marked by a dot-dot-dash line. Waveguide cross-connector 152 has four rib waveguides extending out from the cross-connector, from here onwards called legs, 191, 192, 193, and 194, coupled so that an optical signal entering leg 191 exits from leg 194 (and vice versa), and an optical signal entering leg 192 exits from leg 193 (and vice versa). Thus, third waveguides 120 and 150 of switches 102 and 108, respectively, are coupled to each other through legs 191 and 194, as are third waveguides 130 and 140 of switches 104 and 106 coupled to each other through legs 192 and 193, respectively.

Similarly to optical switch 20, each switch 102, 104, 106, and 108 is actuated through electrodes formed in actuation layer 34. Electrodes 154, 156, and 158 actuate switches 102 and 104, wherein electrode 158 is a common electrode for the two switches, electrode 154 is dedicated to switch 102, and electrode 156 is dedicated to switch 104. Similarly, electrodes 160, 162, and 164 actuate switches 106 and 108, wherein electrode 164 is a common electrode for the two switches, electrode 160 is dedicated to switch 106, and electrode 162 is dedicated to switch 108. The part of actuation layer 34 that is not coupled to the electrodes is coupled to a ground potential 166, causing the cantilever beams under first waveguides 112, 114, 116, and 118 to be permanently at the ground potential.

Electrodes 154, 156, 160, and 162 are all coupled to a first voltage source 168 with an output voltage $V_1$, and common electrodes 158 and 164 are both coupled to a second voltage source 170 with an output voltage $V_2$. Voltage sources 168 and 170 are driven by a controller 172.

Figure 6A:
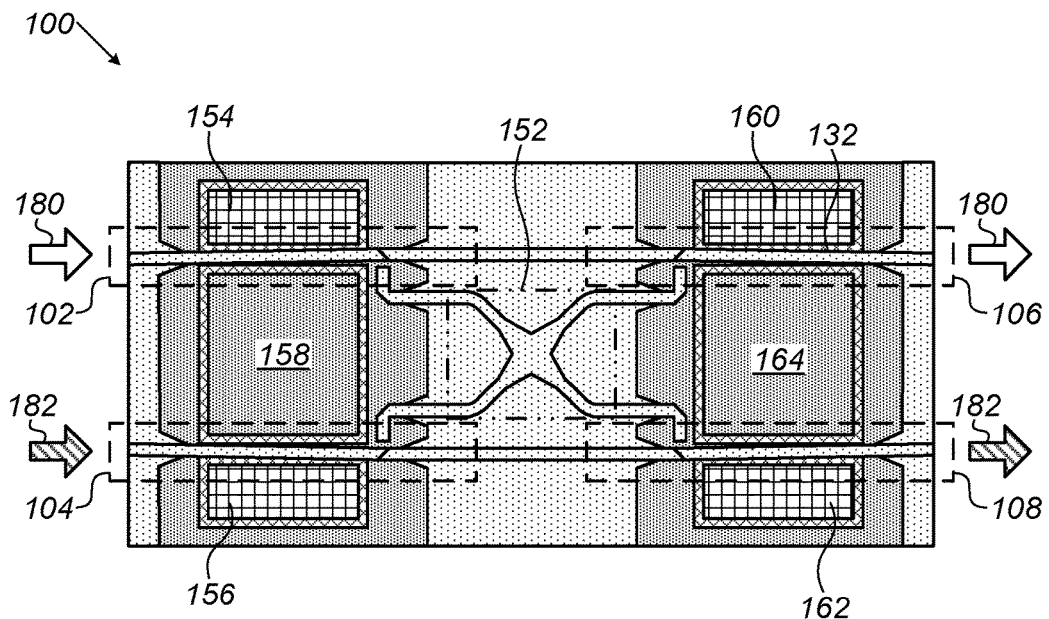
FIGS. 6A-B are schematic top views of the bypass-exchange switch of FIG. 5 in different switching states, in accordance with an embodiment of the invention.
Figure 6B:
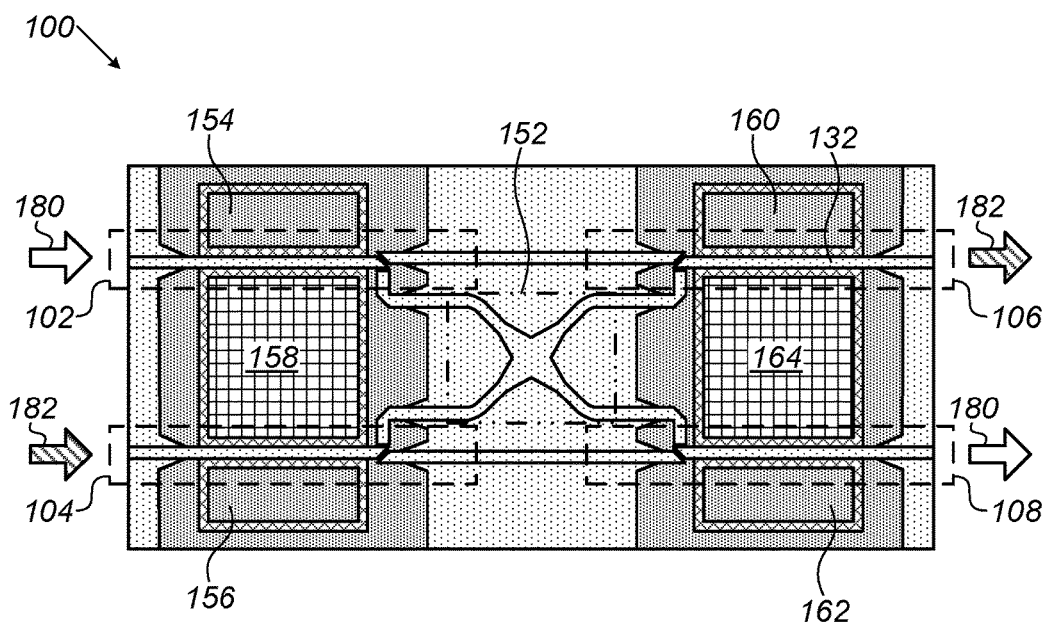

FIGS. 6A-B show schematically the functioning of bypass-exchange switch 100, in accordance with an embodiment of the invention.

The output voltages $V_1$ and $V_2$ of voltage sources 168 and 170, respectively, are driven by controller 172 so that one of them is at a non-zero (positive or negative) voltage, while the other one is at zero voltage. A non-zero voltage on an electrode is indicated in FIGS. 6A-B by cross-hatching. For the sake of clarity, voltage sources 168 and 170, ground 166, and controller 172 are not shown in FIGS. 6A-B, and only electrodes 154, 156, 158, 160, 162, and 164, as well as 1×2 switches 102, 104, 106, and 108 are labelled.

In FIGS. 6A-B a first optical signal 180 and a second optical signal 182, shown schematically as a solid white arrow and a cross-hatched arrow, respectively, are shown both entering into and exiting from bypass-exchange switch 100. In both of FIGS. 6a-b first optical signal 180 enters first waveguide 112 of switch 102 and second optical signal 182 enters first waveguide 122 of switch 104.

In FIG. 6A, with reference to FIG. 5, voltage $V_1$ of voltage source 168 is non-zero and voltage $V_2$ of voltage source 170 is zero. This causes the potentials of electrodes 154, 156, 160, and 162 to be at a the non-zero voltage $V_1$ (shown by cross-hatching), and the potentials of electrodes 158 and 164 to be at zero voltage $V_2$. The end facets of the first and second waveguides of each switch are in close proximity or in contact (corresponding to FIG. 4A). First optical signal 180 propagates from first waveguide 112 to second waveguide 116 (due to FTIR), further to second waveguide 136, and (again due to FTIR) to first waveguide 132, and exits from there. Similarly, second optical signal 182 propagates from first waveguide 122 to second waveguide 126 (due to FTIR), further to second waveguide 146, and (again due to FTIR) to first waveguide 142, and exits from there. This describes a straight-through (bypass) state of bypass-exchange switch 100.

In FIG. 6B, again with reference to FIG. 5, the voltages of voltage sources 168 and 170 are interchanged by controller 172: $V_1$ is now zero and $V_2$ is non-zero. Now the potentials of electrodes 154, 156, 160, and 162 are at the zero voltage of $V_1$, and the potentials of electrodes 158 and 164 are at the non-zero voltage of $V_2$ (shown by cross-hatching). The end facets of first and second waveguides of each switch are separated (corresponding to FIG. 4B), and the signals propagate between the first and third waveguides: First optical signal 180 propagates from first waveguide 112 to third waveguide 120, through legs 191 and 194 of waveguide cross-connector 152 to third waveguide 150, and further to first waveguide 142, exiting from there. Similarly, second optical signal 182 propagates from first waveguide 122 to third waveguide 130, through legs 192 and 193 of waveguide cross-connector 152 to third waveguide 140, and further to first waveguide 132, exiting from there. This describes a cross-state (exchange) of bypass-exchange switch 100.

One bit of information provided to controller 172, that of exchanging the values of voltages $V_1$ and $V_2$, is sufficient to change the state of bypass-exchange switch 100 from its straight-through state to cross-state and back.

The reversibility of the propagation of optical signals in switches 102, 104, 106, and 108 and waveguide cross-connector 152 enables the reversing of optical signals 180 and 182.

In additional embodiments (not shown in the figures), several bypass-exchange switches 100 may be coupled together for an extension to larger switch fabrics.

FIG. 7 is a schematic top view of an optical crossbar switch 200 based on two 1×2 optical switches in a back-to-back configuration, in accordance with an embodiment of the invention.

Crossbar switch 200 comprises two 1×2 switches 202 and 204 on a common substrate, marked by dotted lines, each substantially identical to optical switch 20 of FIG. 1. For clarity, the silicon layers, common to both switches, are not labelled. Similarly to optical switch 20, switches 202 and 204 comprise first, second, and third waveguides according to Table 2, below.

TABLE 2

Labelling of waveguides in crossbar switch 200

| 1 × 2 switch | first waveguide | second waveguide | third waveguide |
|---|---|---|---|
| 202 | 212 | 216 | 220 |
| 204 | 222 | 226 | 230 |

A waveguide cross-connector 232, marked by a dot-dot-dash line and similar to waveguide cross-connector 152, is coupled to switches 202 and 204, with a first leg 234 of the cross-connector coupled to second waveguide 216 and a second leg 236 coupled to second waveguide 226. A third leg 238 and a fourth leg 240 end at the edges of crossbar switch 200. Third waveguide 220 of switch 202 is coupled to third waveguide 230 of switch 204.

Similarly to optical switch 20, both switches 202 and 204 are actuated through electrodes 242, 244 and 246 formed in actuation layer 34. Electrode 242 is dedicated to switch 202, electrode 244 is dedicated to switch 204, and electrode 246 is a common electrode for the two switches. The part of actuation layer 34 not coupled to the electrodes is coupled to a ground potential 247, causing the cantilever beams under first waveguides 212 and 222 to be permanently at the ground potential.

Electrodes 242 and 244 are both coupled to a first voltage source 248, and common electrode 246 is coupled to a second voltage source 250. Voltage sources 248 and 250 are driven by a controller 252.

Figure 8B:
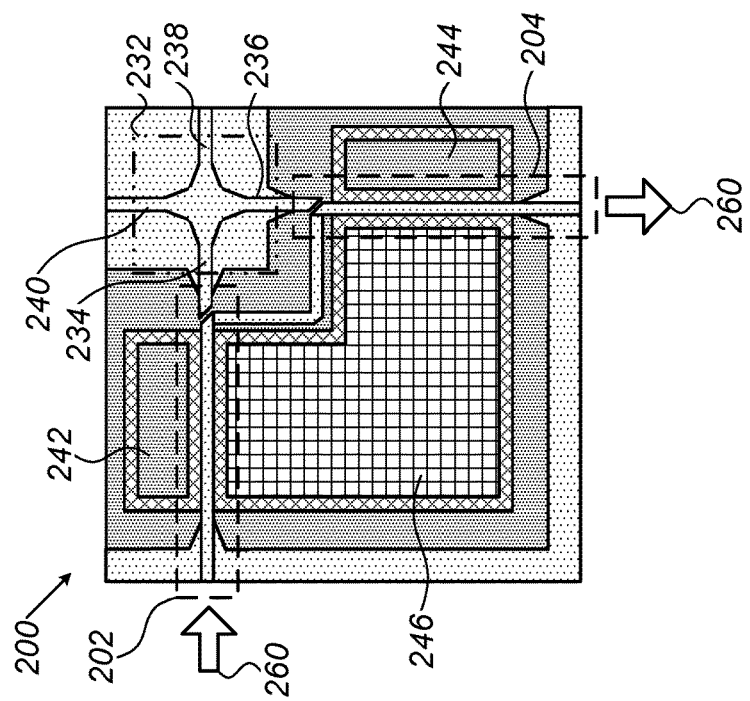
FIGS. 8A-B are schematic top views of the crossbar switch of FIG. 7 in different switching states, in accordance with an embodiment of the invention.
Figure 8A:
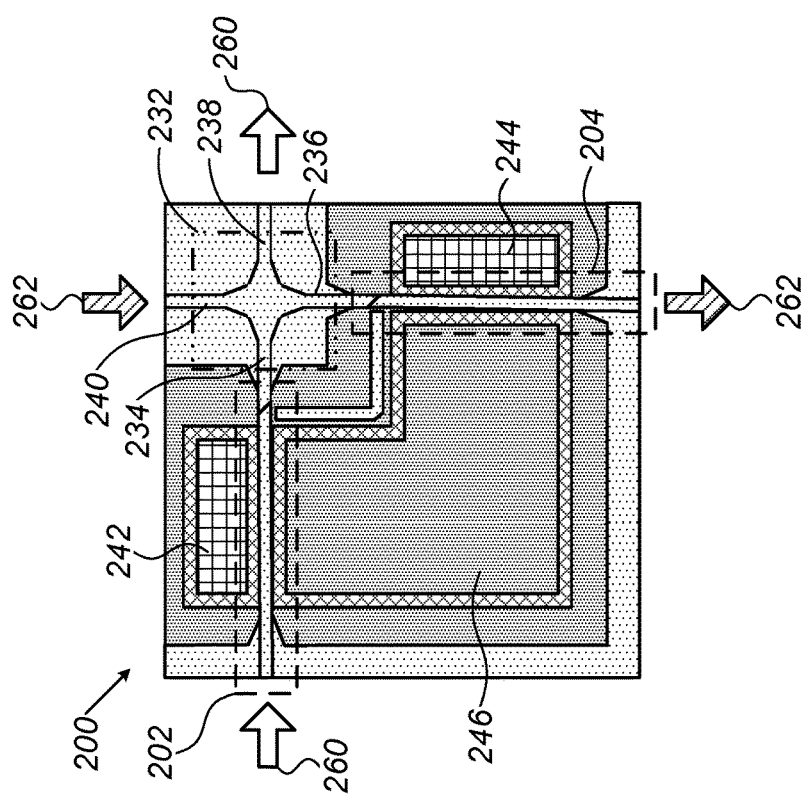

FIGS. 8A-B show schematically the functioning of crossbar switch 200, in accordance with an embodiment of the invention.

The output voltages $V_1$ and $V_2$ of voltage sources 248 and 250, respectively, are driven by controller 252 so that one of them is at a non-zero (positive or negative) voltage, while the other one is at zero voltage. A non-zero voltage on an electrode is indicated in FIGS. 8A-B by cross-hatching of the electrode. For the sake of clarity, voltage sources 248 and 250, ground 247, and controller 252 are not shown in FIGS. 8A-B, and only electrodes 242, 244, and 246, 1×2 switches 202 and 204, and waveguide cross-connector 232 with its legs 234, 236, 238, and 240 are labelled.

In FIGS. 8A-B, a first optical signal 260 is shown schematically as a solid white arrow and a second optical signal 262 is shown schematically as a cross-hatched arrow. First optical signal 260 enters, with reference to FIG. 7, first waveguide 212 of switch 202, and second optical signal 262 enters fourth leg 240 of cross-connector 232.

In FIG. 8A, with reference to FIG. 7, voltage $V_1$ of voltage source 248 is non-zero and voltage $V_2$ of voltage source 250 is zero. Consequently, the potentials of electrodes 242 and 244 are at the non-zero voltage $V_1$, and the potential of electrode 246 is at the zero voltage $V_2$. The end facets of the first and second waveguides of both switches 202 and 204, respectively, are in close proximity or contact (corresponding to FIG. 4A). First optical signal 260, entering switch 202, propagates from first waveguide 212 to second waveguide 216 (due to FTIR) and further to first leg 234 of waveguide cross-connector 232, exiting through third leg 238. Second optical signal 262, entering fourth leg 240 of waveguide cross-connector 232, exits the cross-connector through its second leg 236 and enters second waveguide 226 of switch 204, propagates (due to FTIR) to first waveguide 222 and exits from there.

In FIG. 8B, again with reference to FIG. 7, voltage source 248 voltage $V_1$ is now zero and voltage source 250 voltage $V_2$ is non-zero. Consequently, the potentials of electrodes 242 and 244 are at the zero voltage $V_1$, and the potential of electrode 246 is at the non-zero voltage $V_2$. The end facets of the first and second waveguides of both switches 202 and 204, respectively, are separated from each other (corresponding to FIG. 4B). First optical signal 260, entering switch 202, propagates now (due to TIR) from first waveguide 212 to third waveguide 220, continuing to third waveguide 230. Signal 260 further enters first waveguide 222, and (due to TIR) propagates in the first waveguide and exits from it at the edge of crossbar switch 200.

One bit of information, that of exchanging the values of voltages $V_1$ and $V_2$, is sufficient for driver to drive crossbar switch 200 between its two states.

In additional embodiments, several crossbar switches 200 may be coupled together for an extension to larger switch fabrics, as is known to those skilled in art.

Latching Switches

Figure 9:
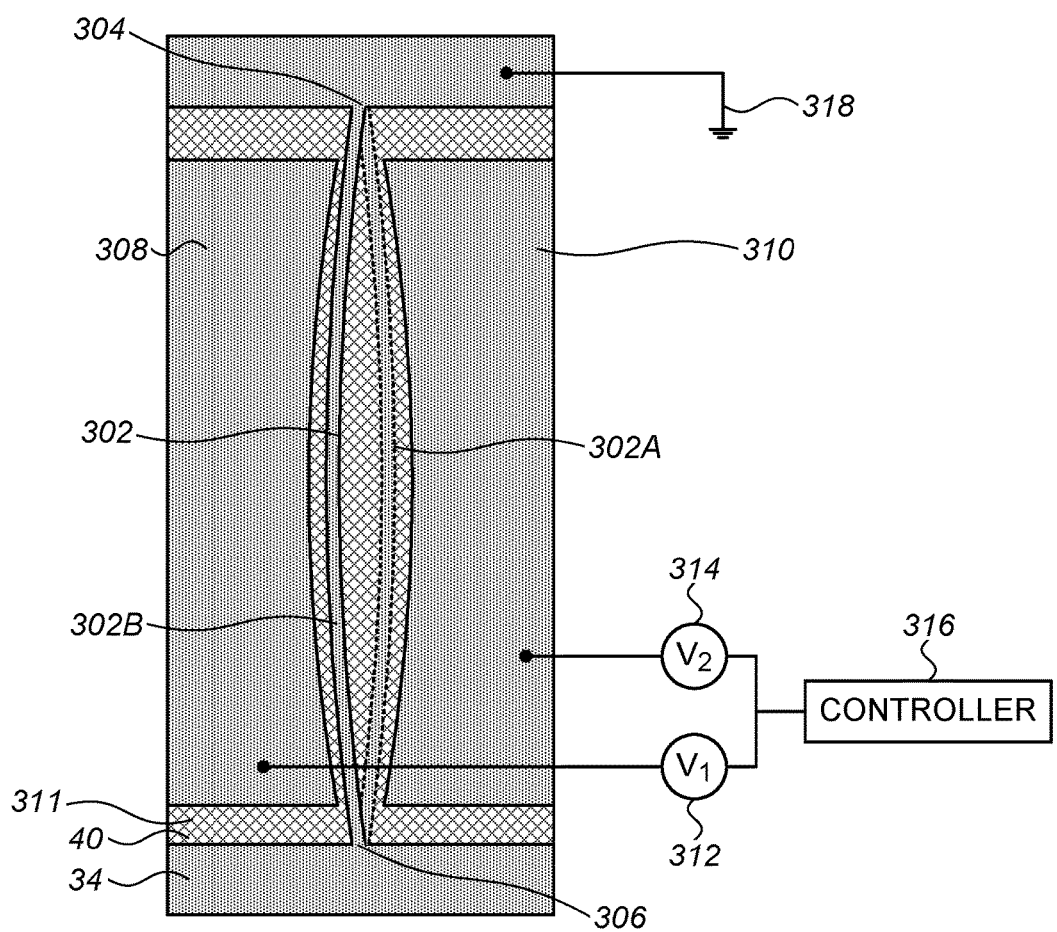
FIG. 9 is a schematic top view of a latching actuator, in accordance with an embodiment of the invention.

FIG. 9 is a schematic top view of a latching actuator 300, in accordance with an embodiment of the invention.

Actuator 300 comprises a silicon beam 302 etched in actuation layer 34 and clamped at its ends at two clamping points 304 and 306. Silicon beam 302 has two mechanically stable beam configurations 302A and 302B, which are, respectively, convex to the right and to the left. In any position between stable beam configurations 302A and 302B beam 302 is under compressive stress. In FIG. 9 silicon beam 302 is shown in its left stable beam configuration 302B, with right stable beam configuration 302A shown by dotted outlines.

Similarly to optical switch 20 of FIG. 1, electrodes 308 and 310 are defined by a trench 311 etched in actuation layer 34 down to isolation layer 40 (seen in the bottom of trench 311 in the top view). A first voltage source 312 and a second voltage source 314 are coupled to electrodes 308 and 310, respectively, and are driven by a controller 316. Silicon beam 302 is coupled to a ground potential 318 through the part of actuation layer 34 that is not connected to electrodes 308 and 310.

FIGS. 10A-B are schematic top views of an optical latching switch 400, in accordance with an embodiment of the invention. Latching switch 400 incorporates latching actuator 300 described in FIG. 9.

Latching switch 400 comprises a first waveguide 320, a second waveguide 322, and a third waveguide 324. First and second waveguides 320 and 322 have respective end facets 330 and 332 at 45° angles, similarly to optical switch 20. Further, similarly to optical switch 20, the end of third waveguide 324 that is closest to first waveguide 320 is oriented perpendicularly to the first waveguide, and has an end facet 334 at a 90° angle with respect to the longitudinal axis of the third waveguide.

For the sake of clarity, voltage sources 312 and 314, as well as controller 316 are not shown in FIGS. 10A-B.

First waveguide 320 is integrally fixed to silicon beam 302 by optical isolation layer 52 (with reference to FIG. 3). Second waveguide 322, however, is released from silicon beam 302 by etching optical isolation layer 52 away during the fabrication process from the area between the second waveguide and the silicon beam. Consequently, a transverse movement of silicon beam 302 moves only first waveguide 320, while second waveguide 322 remains stationary. Third waveguide 324 is also stationary.

In FIG. 10A, controller 316 has driven voltage $V_1$ of voltage source 312 and the potential of electrode 308 to a non-zero value (positive or negative, shown by cross-hatching), while voltage $V_2$ of voltage source 314 is zero. Due to electrostatic forces, silicon beam 302 is pulled to its left position 302B, which brings end facets 330 and 332 to within 5 nm of each other (possibly contacting each other). This is identical to the situation described in FIG. 4A, and an optical signal can propagate by FTIR from first waveguide 320 to second waveguide 322 and vice versa. Due to the mechanical bistability of silicon beam 302, it will remain in left position 302b even if voltage $V_1$ is brought to zero.

In FIG. 10B, controller 316 has driven voltage $V_1$ of voltage source 312 and the potential of electrode 308 to zero, while driving voltage $V_2$ of voltage source 314 and the potential of electrode 310 to a non-zero value (shown by cross-hatching). Due to electrostatic forces, silicon beam 302 is now pulled to its right position 302A, which separates end facets 330 and 332 and brings first waveguide 320 close to or in contact with third waveguide 324. This is identical to the situation described in FIG. 4B, and an optical signal will propagate by TIR from first waveguide 320 to third waveguide 324 and vice versa. Again, similarly to FIG. 10A, bringing voltage $V_2$ to zero leaves silicon beam 302 in right position 302A due to its mechanical bistability.

As shown in FIGS. 10A-B, optical latching switch 400 is switched from one state to another by voltages $V_1$ and $V_2$. However, once a state has been reached, no voltage is required in order to keep optical latching switch 400 in that state.

Manufacturing Process

FIGS. 11A-M and O-V are schematic sectional views showing stages in a process flow of the fabrication of optical switch 20, in accordance with an embodiment of the invention. FIG. 11N is a schematic top view showing a detail of the one of the stages.

Figure 11A:
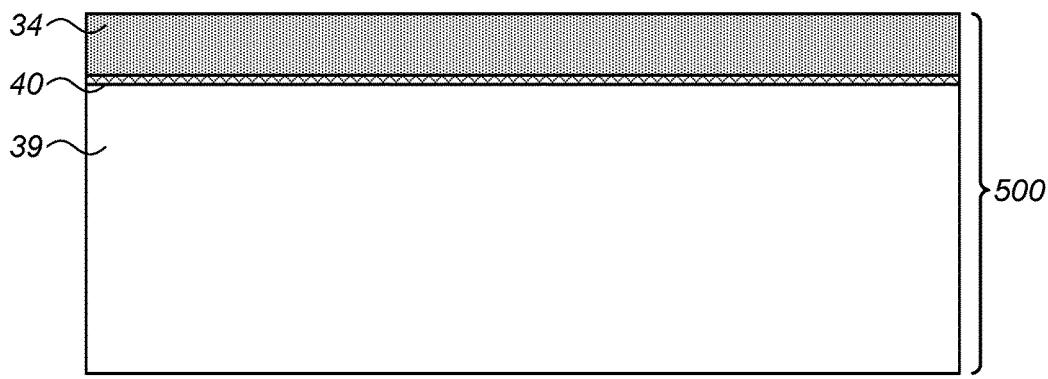
Figure 11B:
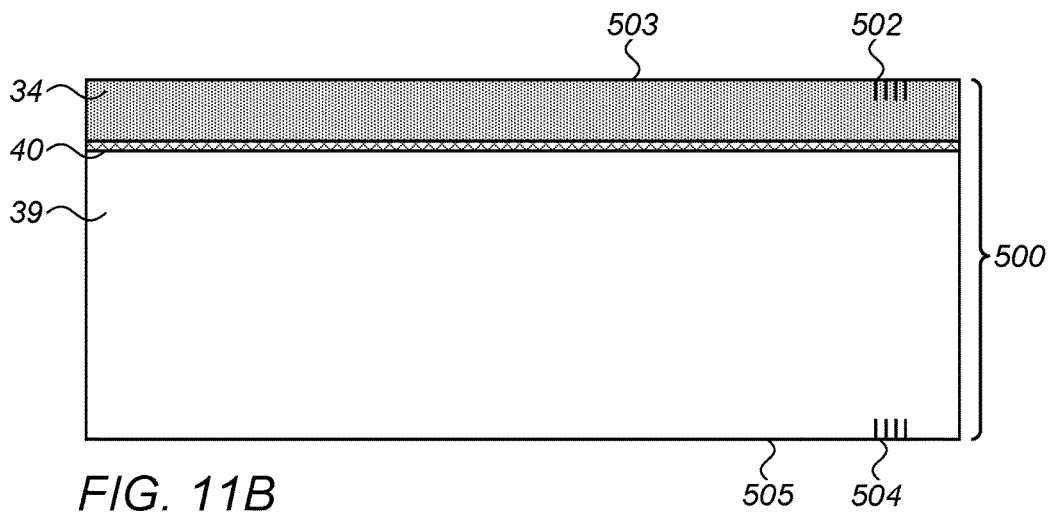
Figure 11C:
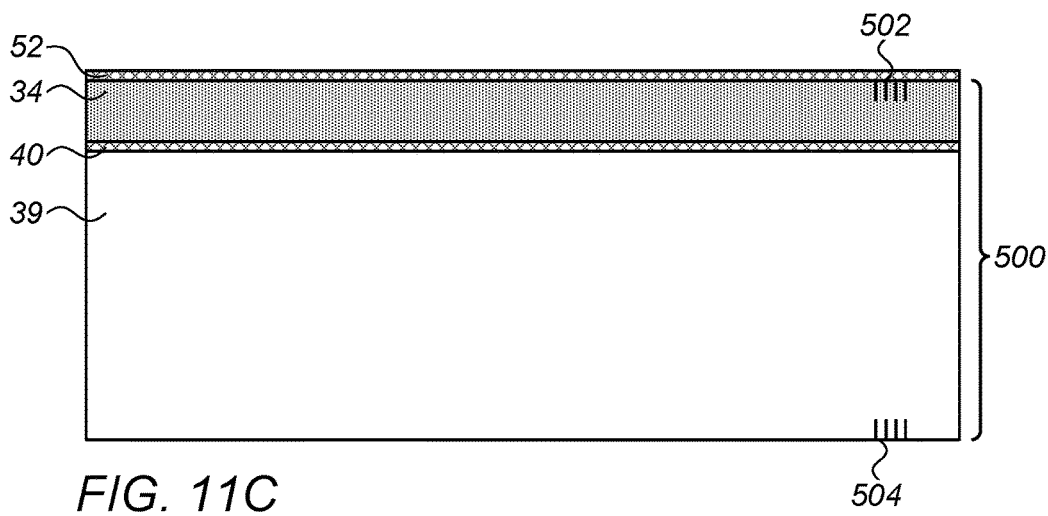
Figure 11D:
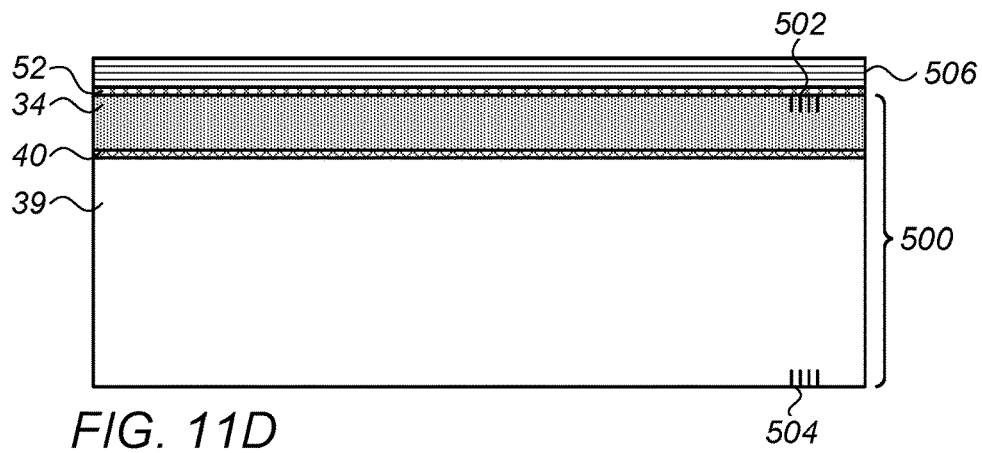
Figure 11E:
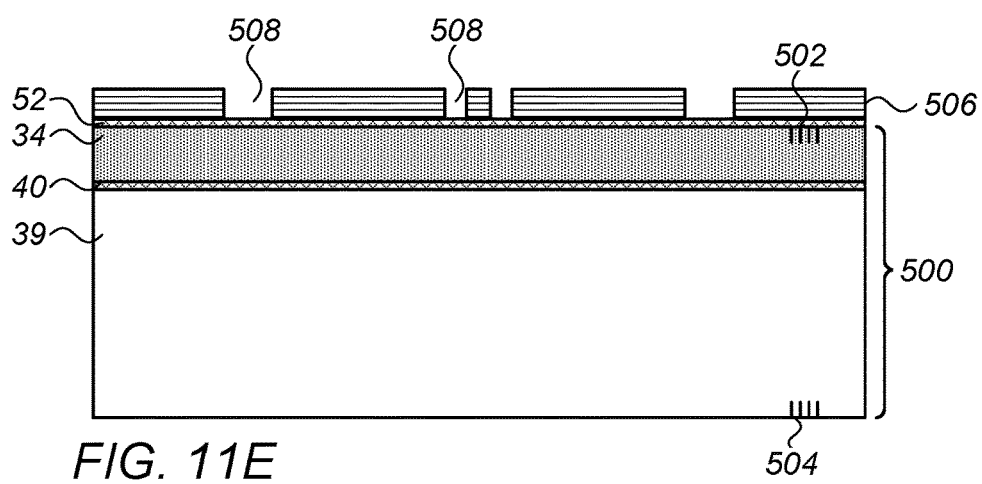
Figure 11F:
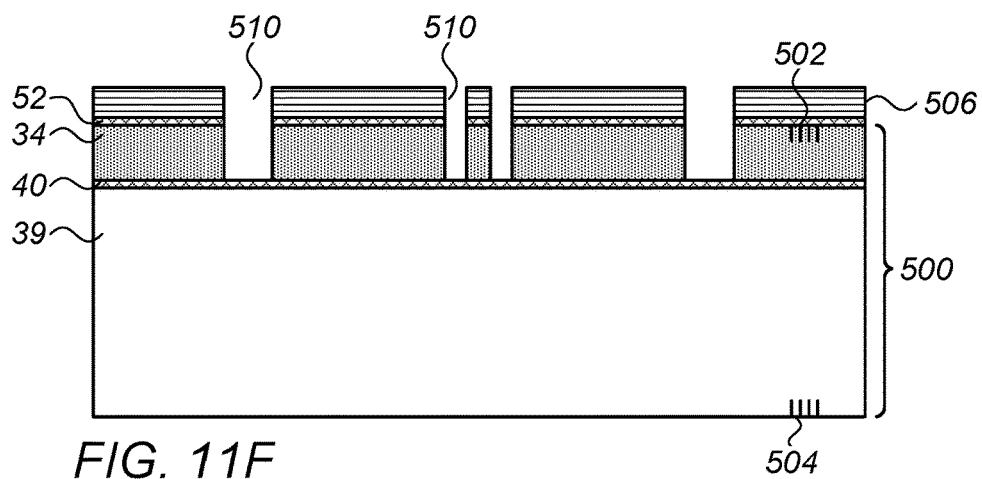
Figure 11G:
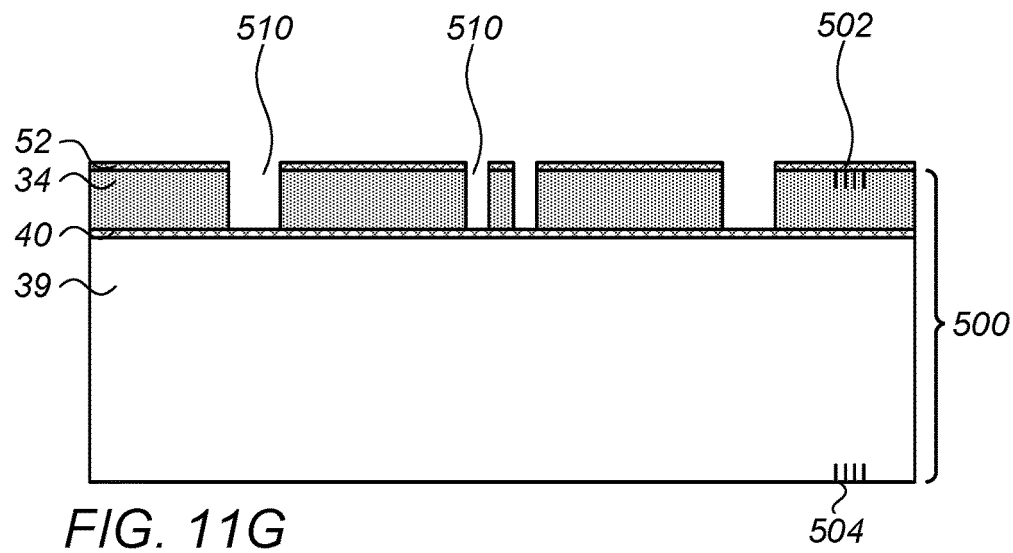
Figure 11H:
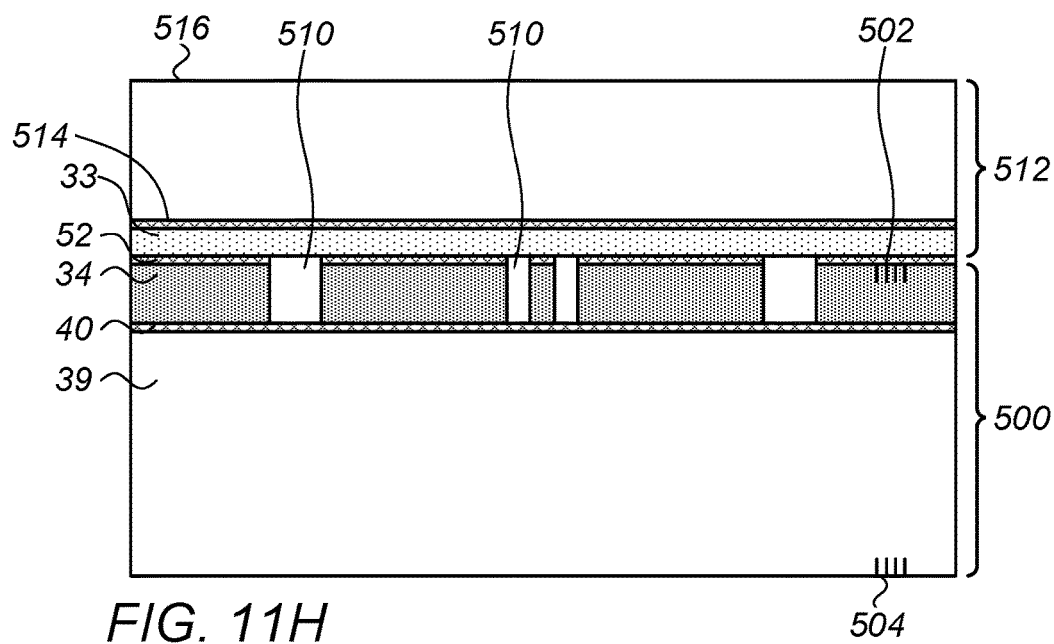
Figure 11I:
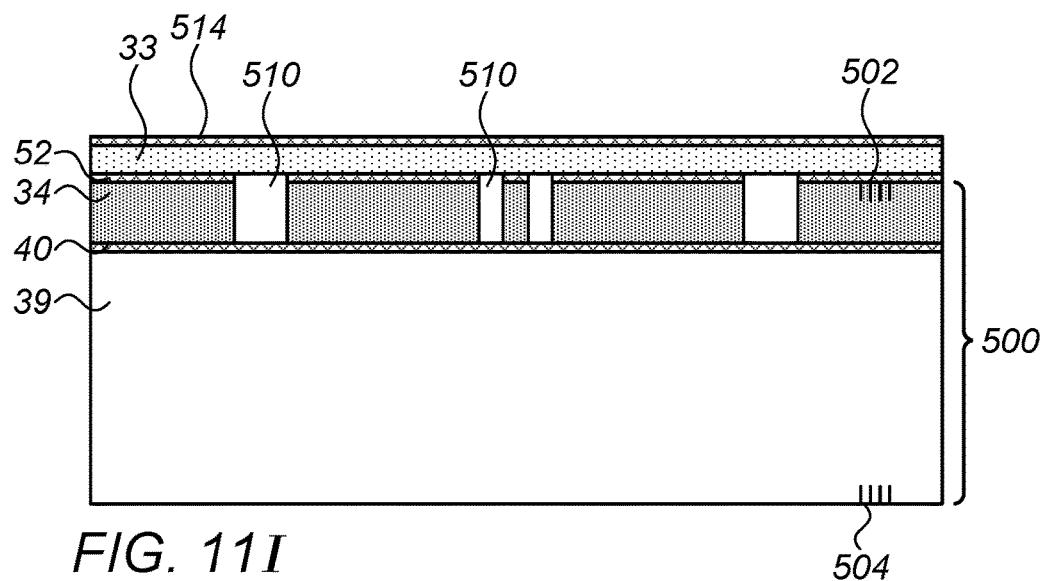
Figure 11J:
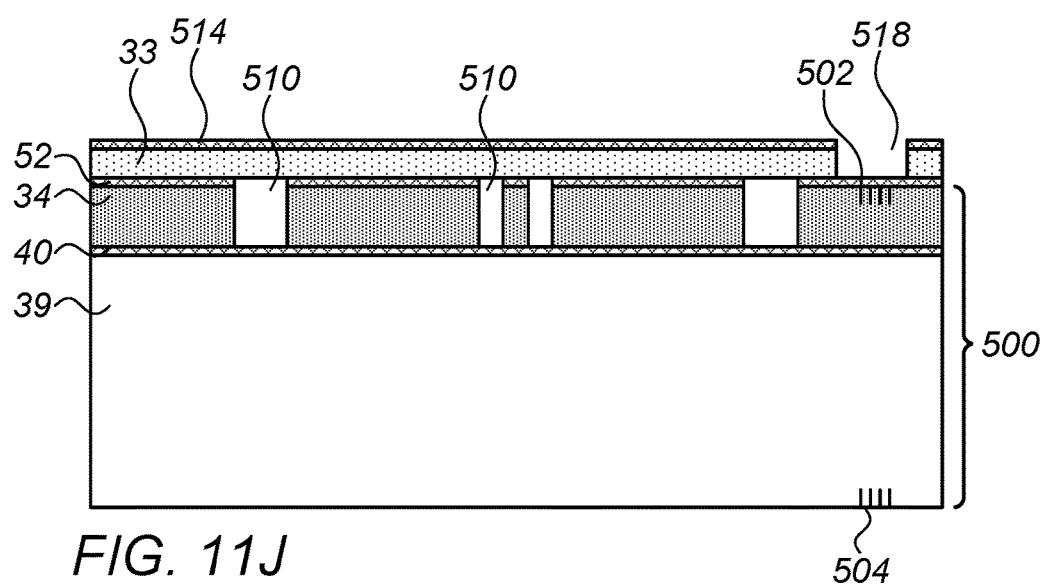
Figure 11K:
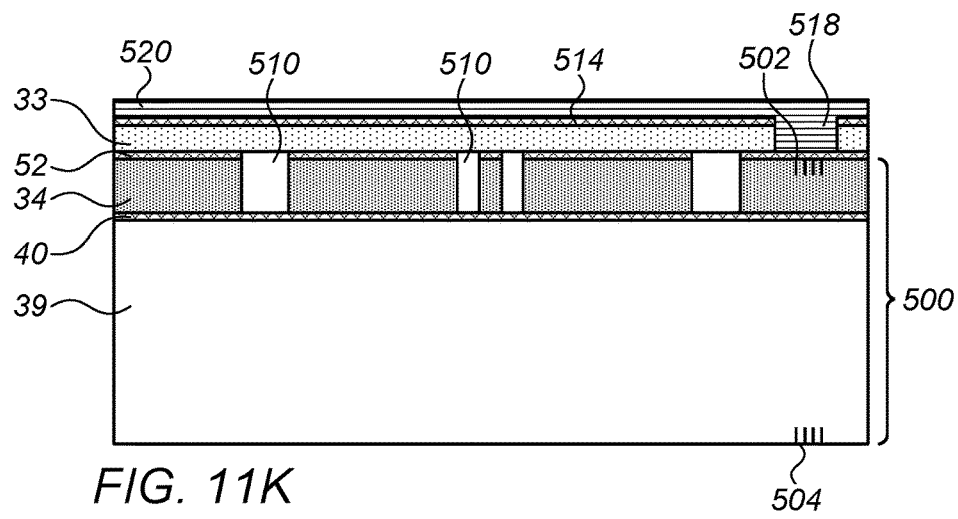
Figure 11L:
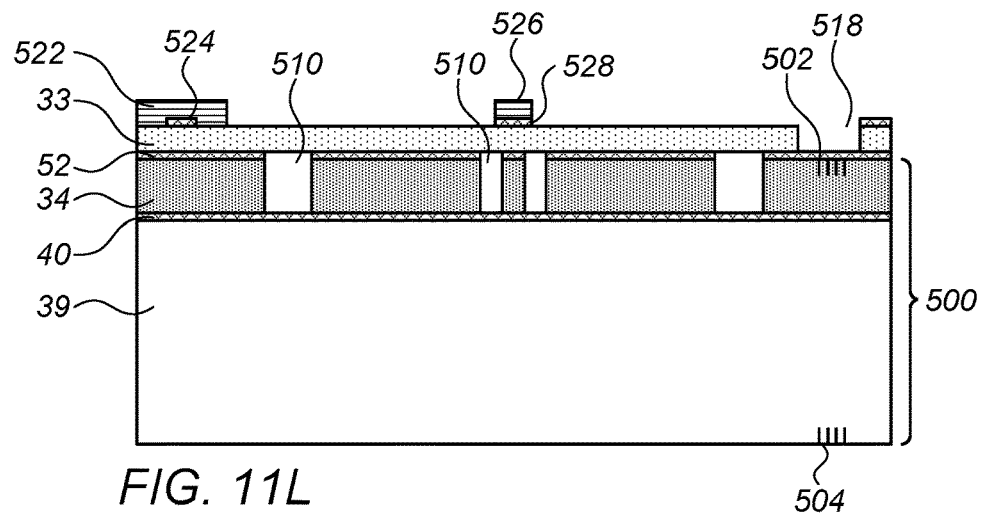
Figure 11M:
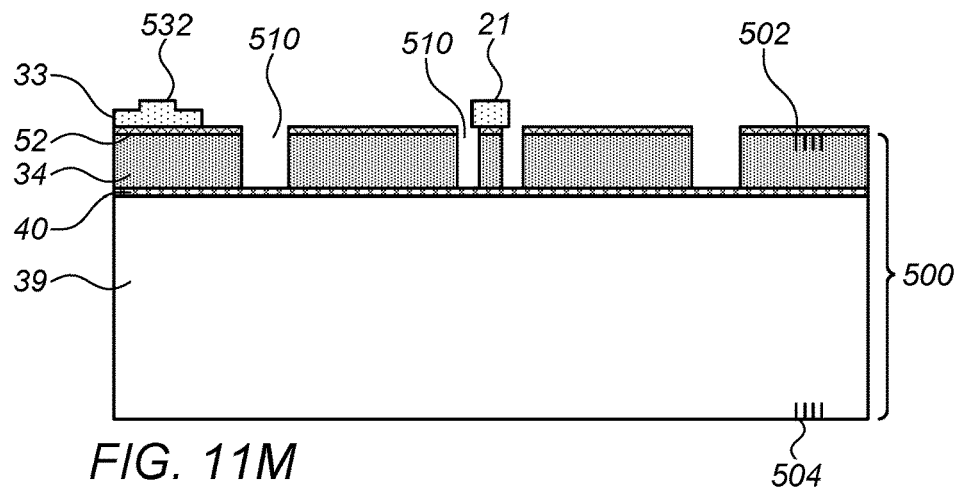
Figure 11N:
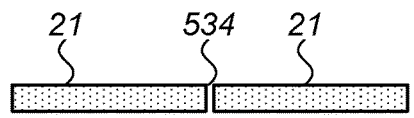
FIG. 11N is a schematic top view showing a detail of the one of the stages, in accordance with an embodiment of the invention.
Figure 11O:
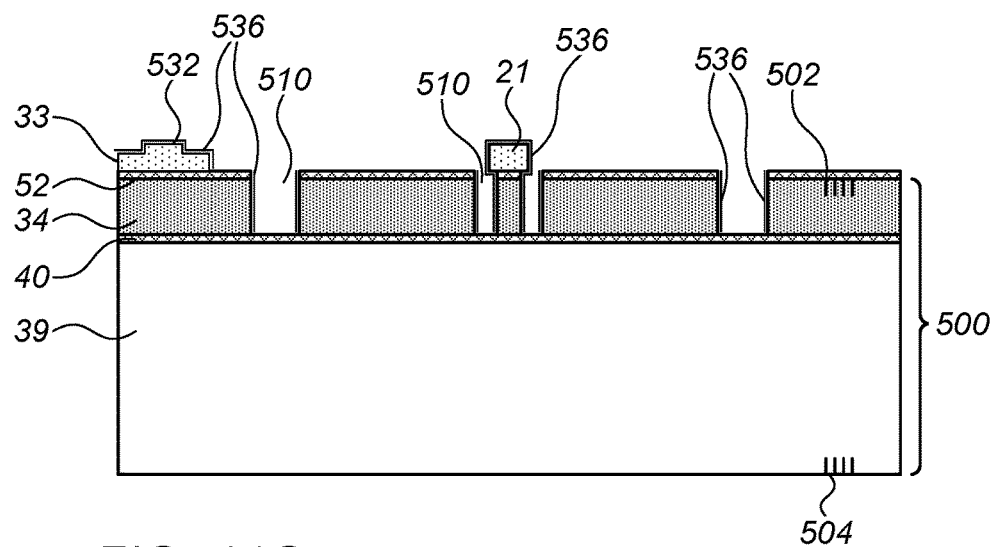
Figure 11P:
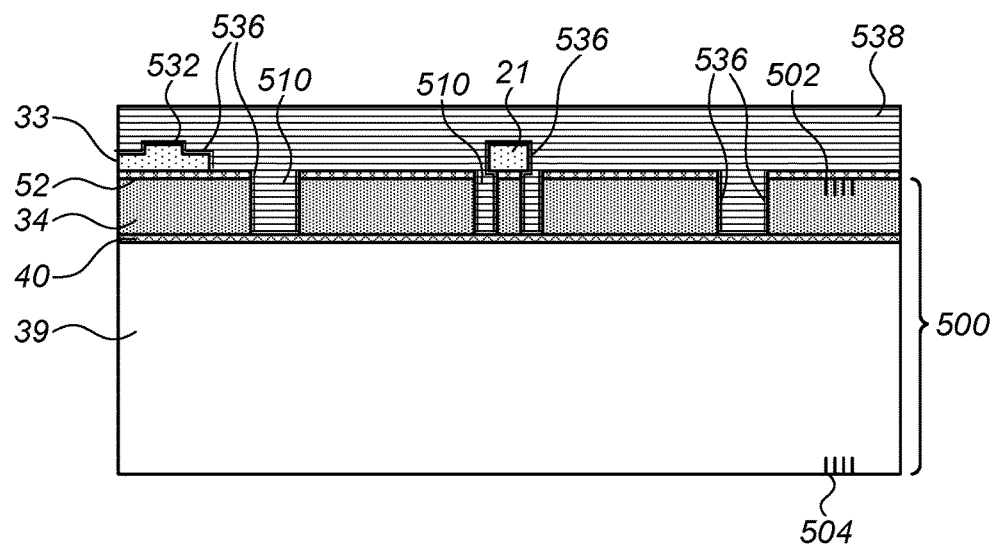
Figure 11Q:
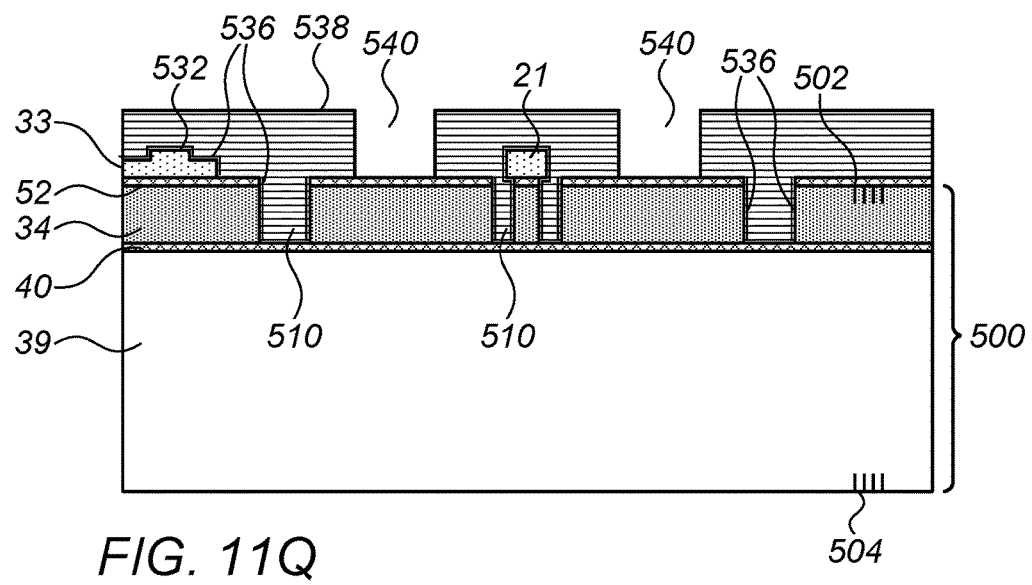
Figure 11R:
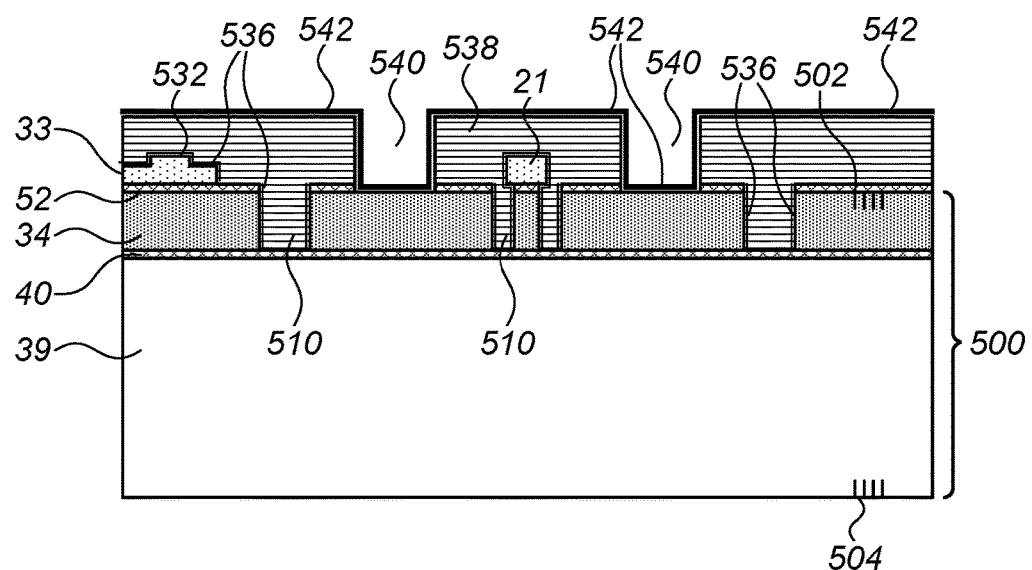
Figure 11S:
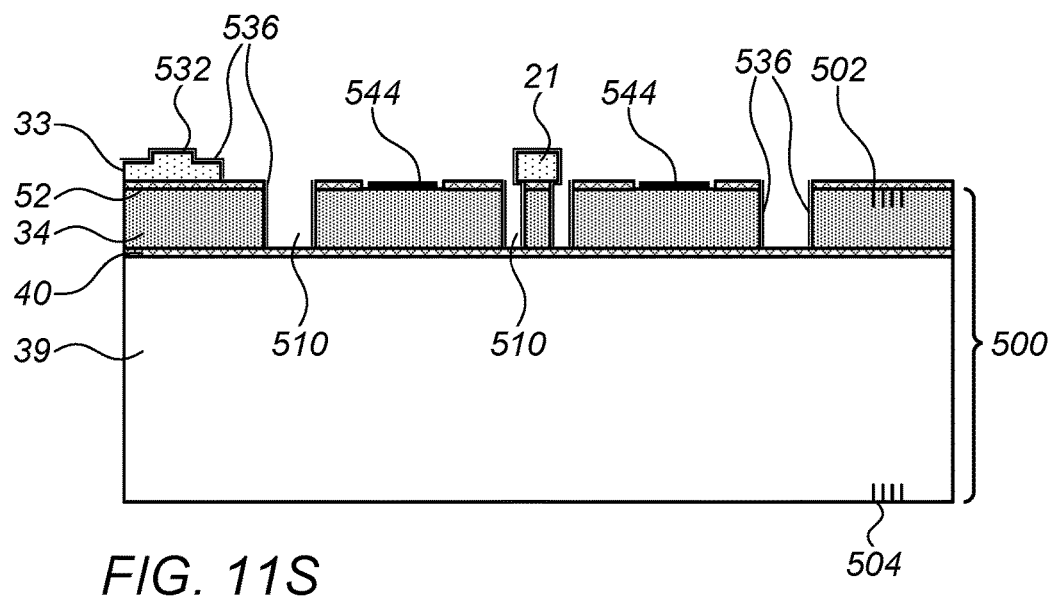
Figure 11T:
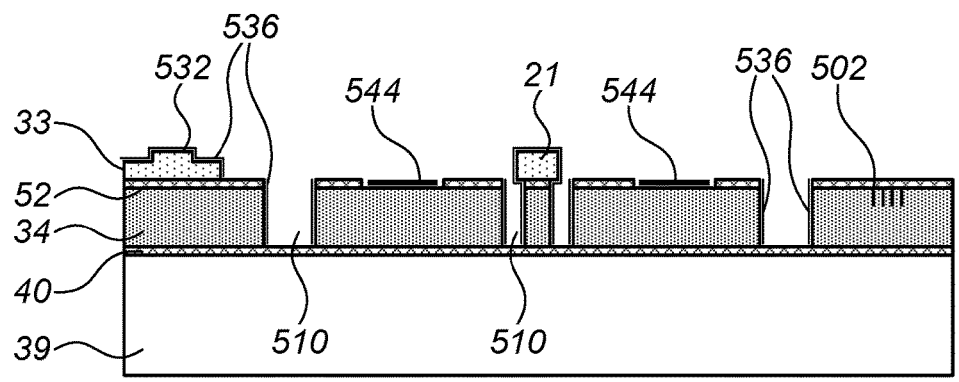
Figure 11U:
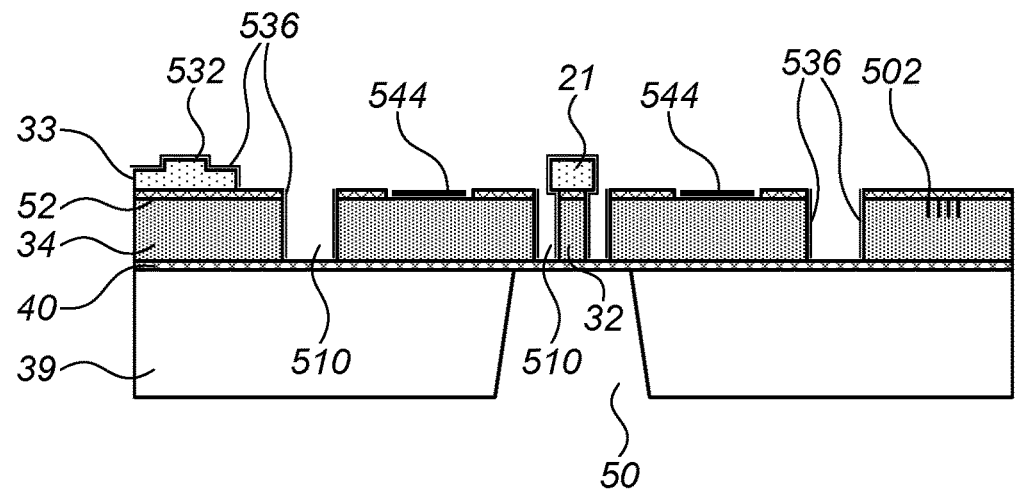
Figure 11V:
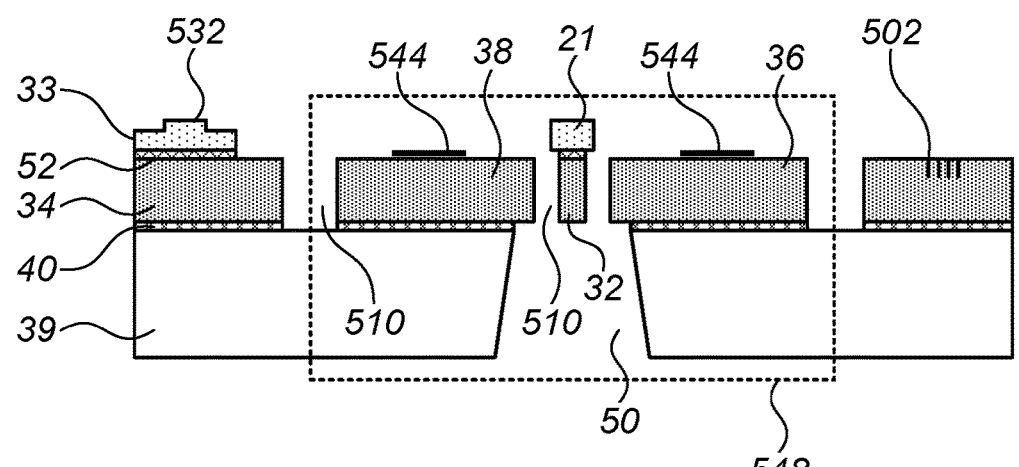

Those layers in the process flow that will become layers of optical switch 20 are throughout FIGS. 11A-V labelled with the same labels that are used in describing optical switch 20 in FIGS. 1-3. The process utilizes lithography, deposition, and etching processes known to those skilled in the art.

FIG. 11A shows a cross section of a silicon-on-insulator (SOI) wafer 500, which is the starting point of the process. SOI wafer 500 comprises silicon substrate 39, isolation layer 40 (buried layer of silicon dioxide $SiO_2$ or other suitable dielectric), and an actuator layer 34. Actuation layer 34 is typically 10-50 µm thick silicon, and is doped for increased electrical conductivity. Isolation layer 40 is typically 1-2 µm thick.

FIG. 11B shows top and bottom alignment marks 502 and 504, respectively, etched onto front and back surfaces 503 and 505, respectively, of SOI 500.

FIG. 11C shows the result after thermal oxidation of front surface 503, which has formed optical isolation layer 52, comprising $SiO_2$. Optical isolation layer 52 is typically 0.5-1 µm thick. The thermal oxidation process forms an oxide layer on back surface 505, as well. This back surface oxide layer is not relevant for the continuation of the process, however, and has been left out for the sake of clarity.

FIG. 11D shows SOI wafer 500 after deposition of a photoresist layer 506.

FIG. 11E shows openings 508 opened in photoresist 506 in a photolithographic process. A typical width of openings 508 is 1-3 µm, and a typical width of the narrowest remaining strips of photoresist 506 is 2-3 µm.

FIG. 11F shows trenches 510 etched through openings 508 using an oxide etch followed by a silicon etch, stopping at isolation layer 40. Roughness of the sidewalls of trenches 510 is not critical at this stage of the process.

FIG. 11G shows SOI wafer 500 after photoresist 506 has been removed. At this stage SOI wafer 500 is cleaned and prepared for a fusion bond.

FIG. 11H shows how a second SOI wafer 512 has been fusion bonded to SOI wafer 500. Second SOI wafer 512 is in a "flipped over" orientation as compared to SOI wafer 500. Second SOI wafer 512 comprises a second substrate 516, a second buried oxide layer 514, and waveguide layer 33. Second buried oxide layer 514 is typically 0.5-1 µm thick. Waveguide layer 33 comprises undoped silicon, typically 3 µm thick.

FIG. 11I shows the result after second substrate 516 has been removed by grinding and a silicon etch that stops at second buried oxide layer 514.

In FIG. 11J a window 518 has been opened through oxide 514 and waveguide layer 33 to expose top alignment mark 502. A rough position of window 518 is established via bottom alignment mark 504.

FIG. 11K shows the deposition of a photoresist 520.

FIG. 11L shows the result after lithography steps for defining a single-mode shallow ridge waveguide 532 and multimode full trench first waveguide 21 (both shown in FIG. 11M). A first photoresist pattern 522 and a first oxide pattern 524 (with a critical dimension typically 3-4 µm) will define shallow ridge waveguide 532, and a second photoresist pattern 526 and a second oxide pattern 528 will define first waveguide 21. The lithography is performed using a dual exposure technique in the photoresist. Alternatively, it may be performed based on a first photoresist and oxide etch, followed by depositing and defining a second photoresist layer. At this process step a critical dimension of 300 nm is required for defining the waveguide gap (shown in FIG. 11N), corresponding to a 1:10 aspect ratio for a 3 µm etch depth.

FIG. 11M shows the result after a dry silicon etch for defining shallow ridge waveguide 532 and first waveguide 21.

FIG. 11N shows a top view of first waveguide 21, with a typical width of 3 µm. A gap 534 in first waveguide 21 has a typical width of 300 nm. Similar gaps may be formed between first, second and third waveguides 21, 23, 25 in their neutral positions as manufactured.

In FIG. 11O, all exposed silicon has been thermally oxidized to generate an oxide layer 536 in order to reduce the sidewall roughness of the waveguides. Repeated oxidization and etching may be used for further reducing the sidewall roughness.

FIG. 11P shows another deposition of a photoresist 538.

FIG. 11Q shows the result after patterning of photoresist 538 to open trenches 540 and etching of optical isolation layer 52 through the trenches in preparation of deposition of metal electrodes.

In FIG. 11R a gold layer 542 has been deposited over the entire wafer.

FIG. 11S shows bond pads 544 formed using lift-off of photoresist 538.

FIG. 11T shows the result after substrate 39 has been thinned to a typical thickness of 400 µm.

In FIG. 11U trough 50 has been opened in substrate 39 by backside DRIE (deep reactive-ion etching) in order to prepare for the release of cantilever beam 32. Typical lateral dimensions of trough 50 are 100 µm×20 µm.

In FIG. 11V all exposed oxide has been etched, typically by vapor etch. Over-etch is not allowed, as this may jeopardize the bond between cantilever beam 32 and first waveguide 21. A frame 548 shows the part of the sectional view of FIG. 11V that corresponds to FIG. 3.

Processes similar to the one shown in FIGS. 11A-V can be used for fabricating bypass-exchange switch 100, crossbar switch 200, and latching switch 400.

Alternatively, other fabrication methods that are known in the art, such as surface micro-machining, may be used.

Figures 12A, 12B:
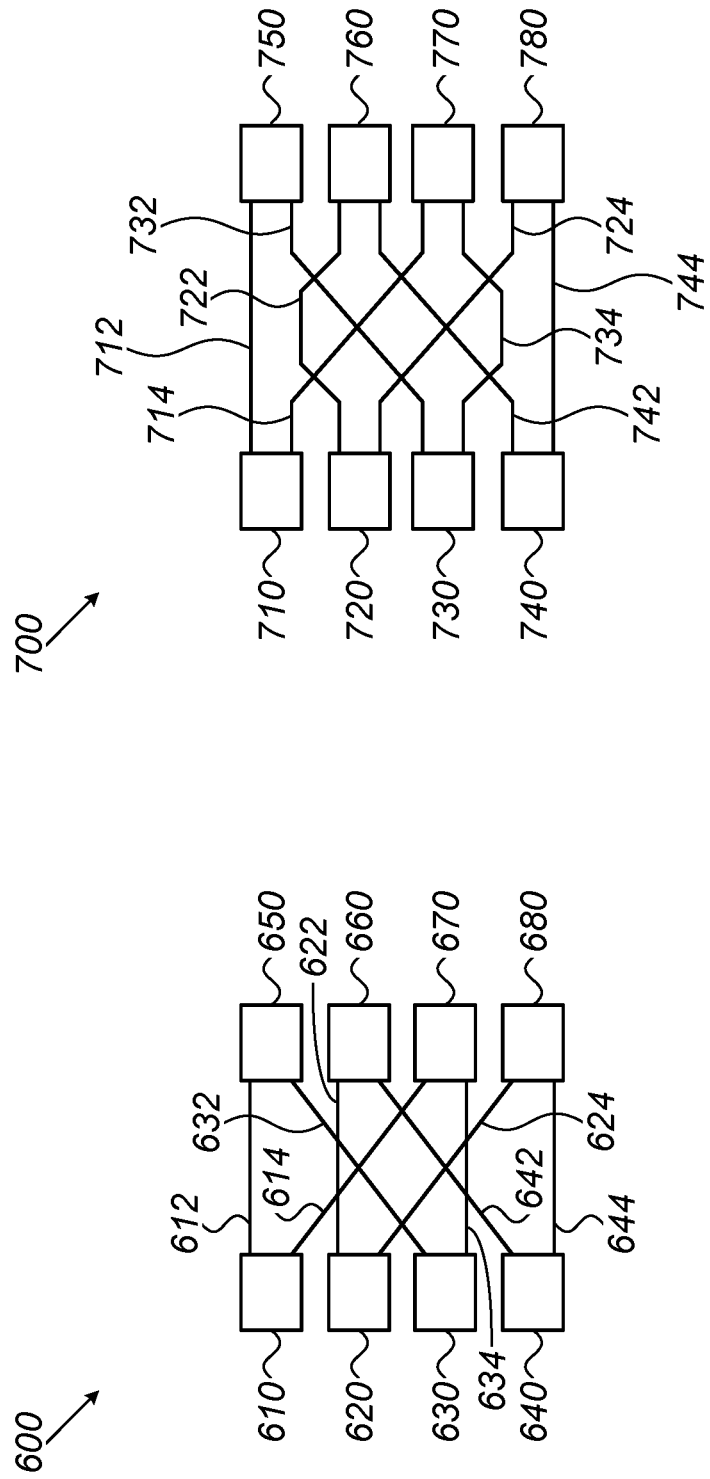
FIGS. 12A-B are schematic top views of two 4×4 optical bypass-exchange switches, one with some oblique and the other with all right-angle waveguide crossings, in accordance with embodiments of the invention.

FIGS. 12A-B are schematic top views of 4×4 optical bypass-exchange switches 600 and 700, with some oblique crossings in switch 600 and all right-angle waveguide crossings in switch 700, in accordance with an embodiment of the invention.

Bypass-exchange switches 600 and 700 are extensions of bypass-exchange switch 100 from a 2×2 switch to a 4×4 switch. Each of bypass-exchange switches 600 and 700 comprises eight 1×2 optical switches 20, in a pairwise back-to-back configuration. The embodiments shown in FIGS. 12A-B illustrate routing of the waveguide interconnects, i.e., to the waveguides coupling the switches to each other, in a manner that minimizes the optical cross-talk between the waveguides. The internal details of the switches have been omitted for the sake of simplicity.

Bypass-exchange switch 600 comprises four 1×2 switches 610, 620, 630, and 640 on the left side of the figure, coupled back-to-back to four 1×2 switches 650, 660, 670, and 680 on the right side of the figure. The interconnects comprise waveguides 612, 614, 622, 624, 632, 634, 642, and 644 according to Table 3, below.

TABLE 3

| Interconnects within bypass-exchange switch 600 | | |
|---|---|---|
| 1 × 2 switch on left | Waveguide | 1 × 2 switch on the right |
| 610 | 612 | 650 |
|  | 614 | 670 |
| 620 | 622 | 660 |
|  | 624 | 680 |
| 630 | 632 | 650 |
|  | 634 | 670 |
| 640 | 642 | 660 |
|  | 644 | 680 |

Bypass-exchange switch 700 comprises, similarly to bypass-exchange switch 600, four 1×2 switches 710, 720, 730, and 740 on the left side of the figure, coupled back-to-back to four 1×2 switches 750, 760, 770, and 780 on the right side of the figure. The interconnects comprise waveguides 712, 714, 722, 724, 732, 734, 742, and 744 according to Table 4, below.

TABLE 4

| Interconnects within bypass-exchange switch 700 | | |
|---|---|---|
| 1 × 2 switch on left | Waveguide | 1 × 2 switch on the right |
| 710 | 712 | 750 |
|  | 714 | 770 |
| 720 | 722 | 760 |
|  | 724 | 780 |
| 730 | 732 | 750 |
|  | 734 | 770 |
| 740 | 742 | 760 |
|  | 744 | 780 |

The optical crosstalk between two crossing waveguides reaches a minimum when the angle between the waveguides is 90°. Several of the interconnects of bypass-exchange switch 600 (although not necessarily all) cross each other at an oblique angle, i.e., at an angle different from 90°, which leads to non-optimal crosstalk. Examples of such oblique crossings may be seen, for instance, at the crossing of waveguides 614 and 622 and at the crossing of waveguides 624 and 634.

In bypass-exchange switch 700, the switches on the left are connected to the switches on the right in the same order as those in bypass-exchange switch 600. However, as opposed to bypass-exchange switch 600, all of the interconnects are routed in such a way that all waveguide crossings form 90° angles. Such a routing minimizes the crosstalk between the interconnects.

Figure 13B:
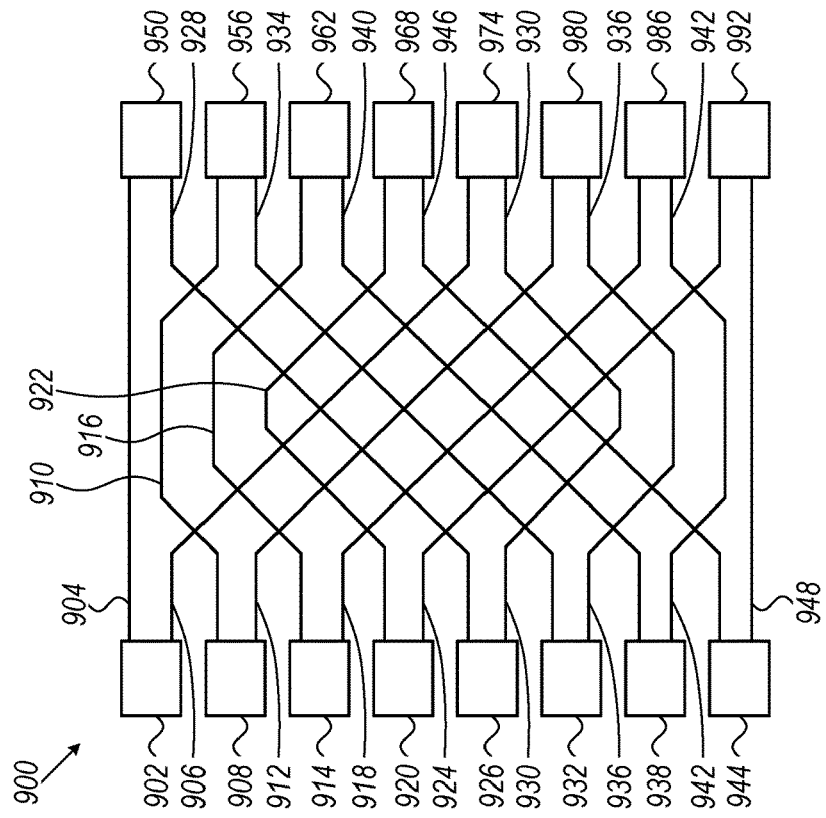
FIGS. 13A-B are schematic top views of two 8×8 optical bypass-exchange switches, one with some oblique and the other with all right-angle waveguide crossings, in accordance with further embodiments of the invention.
Figure 13A:
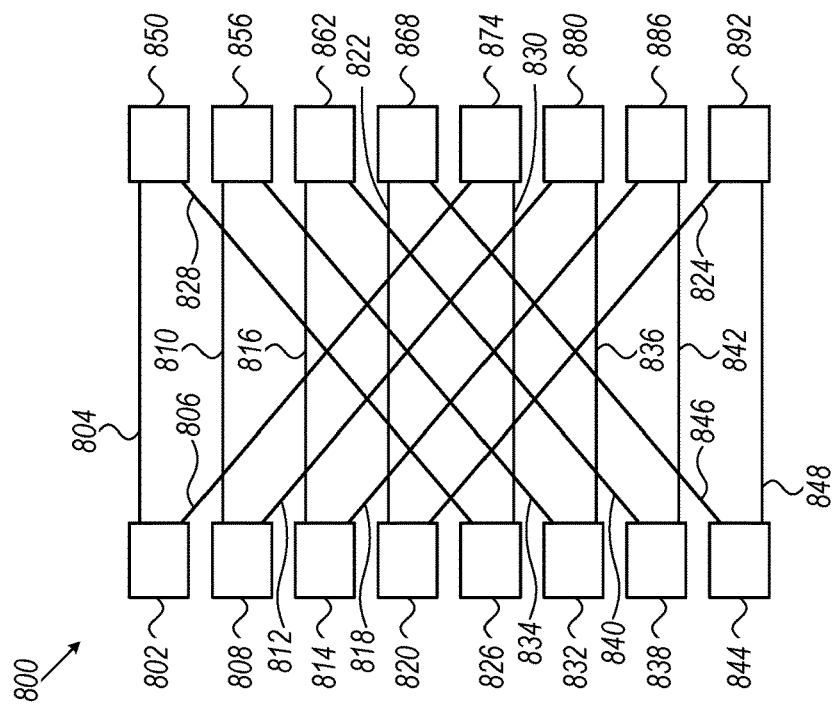

FIGS. 13A-B are schematic top views of 8×8 optical bypass-exchange switches 800 and 900, with some oblique crossings in switch 800 and all right-angle waveguide crossings in switch 900, in accordance with an embodiment of the invention.

Bypass-exchange switches 800 and 900 are extensions of 4×4 bypass-exchange switches 600 and 700, respectively, with each switch 800 and 900 comprising eight 1×2 switches on the left side of FIGS. 13A-B, respectively, and eight 1×2 switches on the right side in a back-to-back configuration. As in FIGS. 12A-B, the details of the 1×2 switches have been omitted for the sake of clarity. The switches and their interconnects are listed in Tables 5-6, below.

TABLE 5

| Interconnects within bypass-exchange switch 800 | | |
|---|---|---|
| 1 × 2 switch on left | Waveguide | 1 × 2 switch on the right |
| 802 | 804 | 850 |
|  | 806 | 874 |
| 808 | 810 | 856 |
|  | 812 | 880 |
| 814 | 816 | 862 |
|  | 818 | 886 |
| 820 | 822 | 868 |
|  | 824 | 892 |
| 826 | 828 | 850 |
|  | 830 | 874 |
| 832 | 834 | 856 |
|  | 836 | 880 |
| 838 | 840 | 862 |
|  | 842 | 886 |
| 844 | 846 | 868 |
|  | 848 | 892 |

TABLE 6

| Interconnects within bypass-exchange switch 900 | | |
|---|---|---|
| 1 × 2 switch on left | Waveguide | 1 × 2 switch on the right |
| 902 | 904 | 950 |
|  | 906 | 974 |
| 908 | 910 | 956 |
|  | 912 | 980 |
| 914 | 916 | 962 |
|  | 918 | 986 |
| 920 | 922 | 968 |
|  | 924 | 992 |
| 926 | 928 | 950 |
|  | 930 | 974 |
| 932 | 934 | 956 |
|  | 936 | 980 |
| 938 | 940 | 962 |
|  | 942 | 986 |
| 944 | 946 | 968 |
|  | 948 | 992 |

As in bypass-exchange switch 600, several of the interconnects of bypass-exchange switch 800 cross each other at an oblique angle, which leads to non-optimal crosstalk. Examples of such oblique crossings may be seen, for instance, at the crossing of waveguides 806 and 828 and at the crossing of waveguides 846 and 842.

In bypass-exchange switch 900, the switches on the left are connected to the switches on the right in the same order as those in bypass-exchange switch 800. However, as opposed to bypass-exchange switch 800, all of the interconnects are routed in such a way that all waveguide crossings form 90° angles. Such a routing minimizes the crosstalk between the interconnects.

Although 4×4 and 8×8 bypass-exchange switches 700 and 900, respectively, are shown as illustrations of interconnect routing with minimal crosstalk, other embodiments may comprise bypass-exchange switches with, for example, 10×10, 16×16, or 32×32 layouts.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optical device, comprising:
a first waveguide having a longitudinal axis and a first end facet inclined at a non-normal angle to the longitudinal axis;
a second waveguide, which has a second end facet and is fixed with the second end facet in proximity to and parallel with the first end facet;
an actuator coupled to move the first end facet of the first waveguide in a direction transverse to the longitudinal axis between a first position in which a distance between the first and second end facets is less than 25 nm, and a second position in which the distance between the first and second end facets is greater than 300 nm; and
a third waveguide, which has a third end facet and is fixed in a disposition such that when the first end facet is in the second position, radiation propagating through the first waveguide is reflected by total internal reflection (TIR) from the first end facet through a side surface of the first waveguide and into the third waveguide through the third end facet.

2. The device according to claim 1, wherein in the first position the first end facet contacts the second end facet.

3. The device according to claim 1, wherein in the second position, the side surface of the first waveguide contacts the third end facet.

4. The device according to claim 3, wherein the second waveguide is aligned along the longitudinal axis, and wherein the first and second end facets are angled at 45° relative to the longitudinal axis.

5. The device according to claim 1, wherein the actuator comprises a micro-electromechanical system (MEMS) mechanism.

6. The device according to claim 5, wherein the MEMS mechanism comprises:
a substrate;
at least one electrode formed on the substrate;
a conductive cantilever beam formed on the substrate in proximity to the at least one electrode, wherein the first waveguide is mounted on the cantilever beam, and the cantilever beam has a first end that is attached to the substrate and a second end, in proximity to the first end facet of the first waveguide, that is released from the substrate; and
a controller coupled to apply a varying electrical potential between the at least one electrode and the cantilever beam so as to deflect the cantilever beam between the first and second positions of the first waveguide.

7. The device according to claim 6, wherein the at least one electrode comprises a pair of electrodes, and the cantilever beam is disposed between the electrodes.

8. The device according to claim 6, wherein the substrate comprises a silicon-on-insulator (SOI) substrate, comprising:
a silicon substrate;
an isolation layer formed on the silicon substrate, wherein the isolation layer comprises a dielectric material; and
an actuation layer formed on the isolation layer, wherein the actuation layer comprises silicon, which is doped for conducting electricity,
wherein the conductive cantilever beam is formed in the actuation layer.

9. The device according to claim 8, wherein the dielectric material comprises silicon dioxide.

10. The device according to claim 6, wherein the conductive cantilever beam is configured to latch in first and second stable beam configurations, such that in the first stable beam configuration the first end facet is in the first position and in the second stable beam configuration the first end facet is in the second position,
wherein the controller is coupled to apply a varying electrical potential between the two electrodes and the beam so as to bend the beam between the first and second stable beam positions.

* * * * *